(12) United States Patent
Cutler et al.

(10) Patent No.: US 12,153,648 B2
(45) Date of Patent: Nov. 26, 2024

(54) QUALITY ESTIMATION MODELS FOR VARIOUS SIGNAL CHARACTERISTICS

(71) Applicant: Microsoft Technology Licensing, LLC, Redmond, WA (US)

(72) Inventors: Ross Cutler, Clyde Hill, WA (US); Vishak Gopal, Redmond, WA (US); Chandan Karadagur Ananda Reddy, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 293 days.

(21) Appl. No.: 17/502,680

(22) Filed: Oct. 15, 2021

(65) Prior Publication Data
US 2023/0117603 A1    Apr. 20, 2023

(51) Int. Cl.
*G06F 18/214*    (2023.01)
*G06N 20/00*    (2019.01)
(Continued)

(52) U.S. Cl.
CPC ......... *G06F 18/2148* (2023.01); *G06N 20/00* (2019.01); *G06T 7/0002* (2013.01);
(Continued)

(58) Field of Classification Search
CPC . G06T 2207/20081; G06T 2207/20084; G06T 2207/10016; G06T 2207/30168;
(Continued)

(56) References Cited

U.S. PATENT DOCUMENTS

2002/0131604 A1\* 9/2002 Amine ................. H04R 29/004
381/58
2008/0153441 A1    6/2008 Gibbs
(Continued)

FOREIGN PATENT DOCUMENTS

CN    111327946 A    6/2020

OTHER PUBLICATIONS

Cauchi, et al., "Non-Intrusive Speech Quality Prediction Using Modulation Energies and LSTM-Network", In Journal of the IEEE/ACM Transactions on Audio, Speech, and Language Processing, vol. 27, Issue 7, Jul. 1, 2019, pp. 1151-1163.
(Continued)

*Primary Examiner* — Margaret G Mastrodonato
(74) *Attorney, Agent, or Firm* — Schwegman Lundberg & Woessner, P.A.

(57) ABSTRACT

This document relates to training and employing of quality estimation models to estimate the quality of different signal characteristics. One example includes a method or technique that can be performed on a computing device. The method or technique can include obtaining training signals exhibiting diverse impairments introduced when the training signals are captured or diverse artifacts introduced by different processing characteristics of a plurality of data enhancement models. The method or technique can also include obtaining quality labels for different signal characteristics of the training signals. The method or technique can also include training at least two different quality estimation models to estimate quality of at least two different signal characteristics based at least on the training signals and the quality labels.

21 Claims, 10 Drawing Sheets

(51) Int. Cl.

| | |
|---|---|
| *G06T 7/00* | (2017.01) |
| *G06T 7/194* | (2017.01) |
| *G06V 10/94* | (2022.01) |
| *G10L 15/06* | (2013.01) |
| *G10L 21/0232* | (2013.01) |
| *G10L 25/30* | (2013.01) |
| *G10L 25/60* | (2013.01) |

(52) U.S. Cl.
CPC .............. *G06T 7/194* (2017.01); *G06V 10/95* (2022.01); *G10L 15/063* (2013.01); *G10L 21/0232* (2013.01); *G10L 25/30* (2013.01); *G10L 25/60* (2013.01); *G06T 2207/10016* (2013.01); *G06T 2207/20081* (2013.01); *G06T 2207/20084* (2013.01); *G06T 2207/30168* (2013.01)

(58) Field of Classification Search
CPC ........... G06T 2207/20076; G10L 25/30; G10L 25/60; G10L 21/0208; G10L 15/063; G10L 15/16
See application file for complete search history.

(56) References Cited

U.S. PATENT DOCUMENTS

| | | | |
|---|---|---|---|
| 2014/0358526 A1* | 12/2014 | Abdelal | H04L 65/80 704/202 |
| 2015/0006164 A1* | 1/2015 | Lu | G10L 25/69 704/222 |
| 2020/0075033 A1 | 3/2020 | Hijazi et al. | |
| 2022/0067940 A1 | 3/2022 | Heng et al. | |
| 2022/0076077 A1 | 3/2022 | Reddy et al. | |
| 2023/0125150 A1 | 4/2023 | Cutler et al. | |
| 2024/0127848 A1 | 4/2024 | Diener | |

OTHER PUBLICATIONS

Mocanu, et al., "No. Reference Video Quality Measurement Added Value of Machine Learning", In Journal of Electronic Imaging, vol. 24, Issue 6, Nov. 1, 2015, 16 Pages.

"International Search Report and Written Opinion Issued in PCT Application No. PCT/US21/034679", Mailed Date : Sep. 16, 2021, 10 Pages.

"Chi-squared test", Retrieved from: https://web.archive.org/web/20210909020812/https://en.wikipedia.org/wiki/Chi-squared_test, Sep. 9, 2021, 7 Pages.

"Methods for Subjective Determination of Transmission Quality", In International Telecommunication Union-T recommendation, P-800, Aug. 30, 1996, 37 Pages.

"Perceptual Evaluation of Speech Quality (PESQ): An Objective Method for End-to-End Speech Quality Assessment of Narrow-Band Telephone Networks and Speech Codecs", In International Telecommunication Union-T Recommendation, P-862, Feb. 2001, 30 Pages.

"Single-ended Method for Objective Speech Quality Assessment in Narrow-band Telephony Applications", In International Telecommunication Union-T Recommendation, May 14, 2004, 66 Pages.

"VGGish", Retrieved from: https://github.com/tensorflow/models/tree/master/research/audioset/vggish, Jun. 9, 2021, 5 Pages.

Xia, et al., "Weighted Speech Distortion Losses for Neural-Network-Based Real-Time Speech Enhancement", In Proceedings of IEEE International Conference on Acoustics, Speech and Signal Processing, May 4, 2020, pp. 871-875.

Avila, et al., "Non-intrusive Speech Quality Assessment using Neural Networks", In Proceedings of IEEE International Conference on Acoustics, Speech and Signal Processing, May 12, 2019, pp. 631-635.

Beerends, et al., "Perceptual Objective Listening Quality Assessment (POLQA), The Third Generation ITU-T Standard for End-to-End Speech Quality Measurement Part II—Perceptual Model", In Journal of the Audio Engineering Society, vol. 61, No. 6, Jun. 2013, pp. 385-402.

Defossez, et al., "Real Time Speech Enhancement in the Waveform Domain", In Repository of arXiv:2006.12847v1, Jun. 23, 2020, 5 Pages.

Dong, et al., "An Attention enhanced multi-task model for objective speech assessment in real-world environments", In Proceedings of IEEE International Conference on Acoustics, Speech and Signal Processing, May 4, 2020, pp. 911-915.

Gamper, et al., "Intrusive and Nonintrusive Perceptual Speech Quality Assessment using a Convolutional Neural Network", In Proceedings of IEEE Workshop on Applications of Signal Processing to Audio and Acoustics, Oct. 20, 2019, pp. 85-89.

Hoshen, et al., "Speech Acoustic Modeling from Raw Multichannel Waveforms", In Proceedings of IEEE International Conference on Acoustics, Speech and Signal Processing, Apr. 19, 2015, pp. 4624-4628.

Karamanolakis, et al., "Leaving No Valuable Knowledge Behind: Weak Supervision with Self-training and Domain-specific Rules", Retrieved From: https://www.microsoft.com/en-us/research/uploads/prod/2021/03/SelftrainWS-NAACL2021.pdf, Mar. 2021, 11 Pages.

Karamanolakis, et al., "Self-Training with Weak Supervision", In Repository of arXiv:2104.05514v1, Apr. 12, 2021, 19 Pages.

Lo, et al., "MOSNet: Deep Learning-based Objective Assessment for Voice Conversion", In Proceedings of 20th Annual Conference of the International Speech Communication Association, Sep. 15, 2019, pp. 1541-1545.

Manocha, et al., "A Differentiable Perceptual Audio Metric Learned from Just Noticeable Differences", In Repository of arXiv:2001.04460v2, May 18, 2020, 6 pages.

Naderi, et al., "An Open source Implementation of ITU-T Recommendation P.808 with Validation", In Repository of arXiv:2005.08138v1, May 17, 2020, 5 Pages.

Pascual, et al., "Time-Domain Speech Enhancement using Generative Adversarial Networks", In Journal of Speech Communication, vol. 114, Nov. 2019.

Reddy, et al., "A Scalable Noisy Speech Dataset and Online Subjective Test Framework", In Proceedings of 20th Annual Conference of the International Speech Communication Association, Sep. 15, 2019, 5 Pages.

Reddy, et al., "DNSMOS P.835: A Non-Intrusive Perceptual Objective Speech Quality Metric to Evaluate Noise Suppressors", In Repository of arXiv:2110.01763v1, Oct. 5, 2021, 5 Pages.

Reddy, et al., "Dnsmos: A Non-Intrusive Perceptual Objective Speech Quality Metric to Evaluate Noise Suppressors", In Proceedings of International Conference on Acoustics, Speech and Signal Processing, Jun. 6, 2021, pp. 6493-6497.

Reddy, et al., "INTERSPEECH 2021 Deep Noise Suppression Challenge", In Repository of arXiv:2101.01902v3, Apr. 5, 2021, 5 Pages.

Reddy, et al., "Supervised Classifiers for Audio Impairments with Noisy Labels", In Proceedings of 20th Annual Conference of the International Speech Communication Association, Sep. 15, 2019, 5 Pages.

Reddy, et al., "The Interspeech 2020 Deep Noise Suppression Challenge: Datasets, Subjective Testing Framework, and Challenge Results", In Journal of Computing Research Repository, May 16, 2020, 5 Pages.

Rix, et al., "Perceptual Evaluation of Speech Quality (PESQ)—A New Method for Speech Quality Assessment of Telephone Networks and Codecs", In Proceedings of IEEE International Conference on Acoustics, Speech, and Signal Processing, May 7, 2001, pp. 749-752.

Rolnick, et al., "Deep Learning is Robust to Massive Label Noise", In Repository of arXiv:1705.10694v1, May 30, 2017, 10 Pages.

Tanaka, et al., "WaveCycleGAN2: Time-domain Neural Post-filter for Speech Waveform Generation", In Repository of arXiv:1904.02892v1, Apr. 5, 2019, 5 Pages.

Winkens, et al., "Contrastive Training for Improved Out-of-Distribution Detection", In Repository of arXiv:2007.05566v1, Jul. 10, 2020, 18 Pages.

(56) References Cited

OTHER PUBLICATIONS

"Librivox Community Podcast", Retrieved From: https://librivox.org/category/librivox-community-podcast/, May 31, 2020, 9 Pages.
"Optimize and Accelerate Machine Learning Inferencing and Training", Retrieved From: https://onnxruntime.al/, Retrieved On: Jan. 6, 2023, 3 Pages.
"PLC-Challenge/PLCMOS", Retrieved From: https://github.com/microsoft/PLC-Challenge/tree/main/PLCMOS, Mar. 7, 2022, 1 Page.
"Subjective evaluation of speech quality with a crowdsourcing approach", Retrieved From: https://www.itu.int/rec/T-REC-P.808-202106-I/en, Jun. 13, 2021, 36 Pages.
Avila, et al., "Non-intrusive speech quality assessment using neural networks", In Repository of arXiv:1903.06908v1, Mar. 16, 2019, 5 Pages.
Bahat, et al., "Self-content-based audio inpainting", In Journal of Signal Processing, vol. 111, Jun. 2015, pp. 61-72.
Barrera, Pablo, "Improving Audio Quality in Duo with WaveNetEQ", Retrieved From: https://ai.googleblog.com/2020/04/improving-audio-quality-in-duo-with.html, Apr. 1, 2020, 6 Pages.
Diener, et al., "Interspeech 2022 audio deep packet loss concealment challenge", In repository of arXiv:2204.05222v1, Apr. 11, 2022, 5 Pages.
Diener, Lorenz, "PLC-Challenge", Retrieved From: https://github.com/microsoft/PLC-Challenge, Oct. 7, 2022, 4 Pages.
Hasslinger, et al., "The gilbert-elliott model for packet loss in real time services on the internet", In Proceedings of 14th GI/ITG Conference—Measurement, Modelling and Evaluation of Computer and Communication Systems, Mar. 31, 2008, 15 Pages.
Hellwig, et al., "Speech codec for the European mobile radio system", In Proceedings of IEEE Global Telecommunications Conference and Exhibition 'Communications Technology for the 1990s and Beyond', Nov. 27, 1989, pp. 1065-1069.
Kalchbrenner, et al., "Efficient Neural Audio Synthesis", In Repository of arXiv:1802.08435v1, Feb. 23, 2018, 10 Pages.
Kegler, et al., "Deep Speech Inpainting of Time-Frequency Masks", In Interspeech 2020, Oct. 25, 2020, pp. 3276-3280.
Kong, et al., "HIFI-GAN: Generative Adversarial Networks for Efficient and High Fidelity Speech Synthesis", In Repository of arXiv:2010.05646v2, Oct. 23, 2020, 14 Pages.
Kubichek, R, "Mel-cepstral distance measure for objective speech quality assessment", In Proceedings of IEEE Pacific Rim Conference on Communications Computers and Signal Processing, May 19, 1993, pp. 125-128.
Lecomte, et al., "Packet-loss concealment technology advances in EVS", In Proceedings of IEEE International Conference on Acoustics, Speech and Signal Processing, Apr. 19, 2015, pp. 5708-5712.
Lin, et al., "A Time-Domain Convolutional Recurrent Network for Packet Loss Concealment", In Proceedings of IEEE International Conference on Acoustics, Speech and Signal Processing, Jun. 6, 2021, pp. 7148-7152.
Mittag, et al., "NISQA: A Deep CNN-Self-Attention Model for Multidimensional Speech Quality Prediction with Crowdsourced Datasets", In Proceedings of Interspeech 2021, Aug. 30, 2021, pp. 2127-2131.
Mohamed, et al., "ConcealNet: An End-to-end Neural Network for Packet Loss Concealment in Deep Speech Emotion Recognition", In Repository of arXiv:2005.07777v1, May 15, 2020, 5 Pages.
Morrone, et al., "Audio-Visual Speech Inpainting with Deep Learning", In Proceedings of IEEE International Conference on Acoustics, Speech and Signal Processing, Jun. 6, 2021, pp. 6653-6657.
Nair, et al., "Cascaded Time + Time-Frequency Unet For Speech Enhancement: Jointly Addressing Clipping, Codec Distortions, And Gaps", In Proceedings of IEEE International Conference on Acoustics, Speech and Signal Processing, Jun. 6, 2021, pp. 7153-7157.
Panayotov, et al., "Librispeech: an Asr Corpus Based on Public Domain Audio Books", In Proceedings of IEEE International Conference on Acoustics, Speech and Signal Processing, Apr. 19, 2015, pp. 5206-5210.

Pascual, et al., "Adversarial Auto-Encoding for Packet Loss Concealment", In Repository of arXiv:2107.03100v2, Jul. 8, 2021, 5 Pages.
Purin, et al., "Aecmos: A speech quality assessment metric for echo impairment", In Proceedings of IEEE International Conference on Acoustics, Speech and Signal Processing, May 23, 2022, pp. 901-905.
Reddy, et al., "DNSMOS: A Non-Intrusive Perceptual Objective Speech Quality metric to evaluate Noise Suppressors", In Repository of arXiv:2010.15258v2, Feb. 10, 2021, 5 Pages.
Rodbro, et al., "Hidden Markov model-based packet loss concealment for voice over IP", In Journal of IEEE Transactions on Audio, Speech, and Language Processing, vol. 14, Issue 5, Sep. 2006, pp. 1609-1623.
Ronneberger, et al., "U-Net: Convolutional Networks for Biomedical Image Segmentation", In Repository of arXiv:1505.04597v1, May 18, 2015, 8 Pages.
Serrà, et al., "SESQA: semi-supervised learning for speech quality assessment", In Repository of arXiv:2010.00368v2, Feb. 8, 2021, 14 Pages.
Shi, et al., "Speech Loss Compensation by Generative Adversarial Networks", In Proceedings of Asia-Pacific Signal and Information Processing Association Annual Summit and Conference, Nov. 18, 2019, pp. 347-351.
Sun, et al., "Impact of Packet Loss Location on Perceived Speech Quality", In 2nd IP-Telephony workshop, Apr. 6, 2001, 9 Pages.
Taal, et al., "An Algorithm for Intelligibility Prediction of Time-Frequency Weighted Noisy Speech", In Proceedings of IEEE Transactions on Audio, Speech, and Language Processing, vol. 19, No. 7, Feb. 14, 2011, pp. 2125-2136.
Thakker, et al., "Fast Real-time Personalized Speech Enhancement: End-to-End Enhancement Network (E3Net) and Knowledge Distillation", In Proceedings of Interspeech 2022, Sep. 18, 2022, pp. 991-995.
Thirunavukkarasu, et al., "A survey on VoIP packet loss techniques", In International Journal of Communication Networks and Distributed Systems, vol. 14, Issue 1, Jan. 1, 2015, pp. 106-116.
Wang, et al., "A temporal-spectral generative adversarial network based end-to-end packet loss concealment for wideband speech transmission", In The Journal of the Acoustical Society of America, vol. 150, No. 4, Oct. 11, 2021, pp. 2577-2588.
Yu, et al., "The accuracy of gilbert models in predicting packetloss statistics for a single-multiplexer network model", In Proceedings IEEE 24th Annual Joint Conference of the IEEE Computer and Communications Societies., Mar. 13, 2005, pp. 2602-2612.
Zhou, et al., "Vision-Infused Deep Audio Inpainting", In Proceedings of IEEE/CVF International Conference on Computer Vision, Oct. 27, 2019, pp. 283-292.
"Adaptive Multi-Rate (AMR) speech codec; Error concealment of lost frames", Retrieved From: https://web.archive.org/web/20221209164743/https://portal.3gpp.org/desktopmodules/Specifications/SpecificationDetails.aspx?specificationId=1425, Dec. 9, 2022, 1 Page.
"Final Office Action Issued in U.S. Appl. No. 17/062,308", Mailed Date: Aug. 18, 2023, 17 Pages.
"Non-Final Office Action Issued in U.S. Appl. No. 17/062,308", Mailed Date: May 11, 2023, 14 Pages.
Non-Final Office Action mailed on Jan. 9, 2024, in U.S. Appl. No. 17/062,308, 18 pages.
Abadi, et al., "Deep Learning with Differential Privacy", In Proceedings of the ACM SIGSAC Conference on Computer and Communications Security, Oct. 24, 2016, pp. 308-318.
Braun, et., "Data augmentation and loss normalization for deep noise suppression.", In International Conference on Speech and Computer, Sep. 24, 2020, pp. 79-86.
Carlini, et al., "Extracting training data from large language models.", In 30th USENIX Security Symposium (USENIX Security 21), 2021, pp. 2633-2650.
Chandan, et al., "ICASSP 2021 deep noise suppression challenge.", In ICASSP 2021-2021 IEEE International Conference on Acoustics, Speech and Signal Processing (ICASSP), IEEE, 2021, Oct. 26, 2020, pp. 6623-6627.

(56) References Cited

OTHER PUBLICATIONS

Corinna, et al., "Learning bounds for importance weighting.", Advances in neural information processing systems 23, 2010, pp. 1-9.

Dhruv, et al., "Training speech recognition models with federated learning: A quality/cost framework.", In ICASSP 2021-2021 IEEE International Conference on Acoustics, Speech and Signal Processing (ICASSP), May 14, 2021, pp. 3080-3084.

Diener, et al., "PLCMOSV2—A data-driven non-intrusive metric for the evaluation of deep learning packet loss concealment algorithms", Microsoft Corporation, 2023, 05 Pages.

Gemmeke, et al., "Audio Set: An Ontology and Human-Labeled Dataset for Audio Events", In Proceedings of International Conference on Acoustics, Speech and Signal Processing, Mar. 5, 2017, pp. 776-780.

Gitiaux, X, et al., "Aura: Semi-Supervised Augmentation to Improve Test Set Diversity in Noise Suppression Applications", ICASSP 2023—2023 IEEE International Conference on Acoustics, Speech and Signal Processing, Jun. 4-10, 2023, 7 pages.

Grollmisch, et al., "Analyzing the potential of pretrained embeddings for audio classification tasks.", In 2020 28th European Signal Processing Conference (EUSIPCO), 2021, pp. 790-794.

Henrik, et al., "Optimal sampling in unbiased active learning.", International Conference on Artificial Intelligence and Statistics. PMLR, 2020, 10 Pages.

Hershey, et al., "CNN Architectures for Large-Scale Audio Classification", In 2017 IEEE International conference on acoustics, speech and signal processing (ICASSP), Jan. 10, 2017, 5 Pages.

Jannik, et al., "Active testing: Sample-efficient model evaluation.", International Conference on Machine Learning, PMLR, 2021, 11 Pages.

Kolesnikov, et al., "Revisiting self-supervised visual representation learning", In Proceedings of the IEEE/CVF conference on computer vision and pattern recognition, 2019, pp. 1920-1929.

Konecny, et al., "Federated Learning: Strategies for Improving Communication Efficiency", arXiv preprint arXiv:1610.05492 8, Oct. 30, 2017, pp. 1-5.

Meng, et al., "Cycle-consistent speech enhancement.", arXiv preprint arXiv:1809.02253, Apr. 30, 2019, pp. 1-5.

Namit, et al., "Active evaluation of classifiers on large datasets.", In 2012 IEEE 12th International Conference on Data Mining, 2012, pp. 329-338.

Settles, Burr, "Active Learning Literature Survey", In Technical Report 1648 of Computer Sciences, University of Wisconsin-Madison, Jan. 9, 2009, 47 Pages.

Shokri, et al., "Membership Inference Attacks Against Machine Learning Models", In Proceedings of IEEE Symposium on Security and Privacy, May 22, 2017, pp. 3-18.

Sinha, et al., "Variational adversarial active learning.", In Proceedings of the IEEE/CVF International conference on computer vision, Aug. 16, 2019, pp. 5972-5981.

Yarin, et al., "Deep Bayesian Active Learning with Image Data", In International conference on machine learning, 2017, pp. 1183-1192.

Ziyi, et al., "Deep noise suppression with non-intrusive pesqnet supervision enabling the use of real training data.", arXiv preprint arXiv:2103.17088, Mar. 31, 2021, pp. 1-5.

\* cited by examiner

QUALITY ESTIMATION MODELS FOR VARIOUS SIGNAL CHARACTERISTICS

BACKGROUND

Machine learning can be used to perform a broad range of tasks, such as natural language processing, financial analysis, and image processing. Machine learning models can be trained using several approaches, such as supervised learning, semi-supervised learning, unsupervised learning, reinforcement learning, etc. In approaches such as supervised or semi-supervised learning, labeled training examples can be used to train a model to map inputs to outputs. In unsupervised learning, models can learn from patterns present in an unlabeled dataset.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to techniques for training and employing of quality estimation models to estimate the quality of different signal characteristics. One example includes a method or technique that can be performed on a computing device. The method or technique can include obtaining training signals exhibiting diverse impairments introduced when the training signals are captured or diverse artifacts introduced by different processing characteristics of a plurality of data enhancement models. The method or technique can also include obtaining quality labels for different signal characteristics of the training signals. The method or technique can also include training at least two different quality estimation models to estimate quality of at least two different signal characteristics based at least on the training signals and the quality labels.

Another example includes a system having a hardware processing unit and a storage resource storing computer-readable instructions. When executed by the hardware processing unit, the computer-readable instructions can cause the system to access a plurality of quality estimation models that have been trained to estimate signal quality of different signal characteristics using training signals. The training signals can have corresponding quality labels for the different signal characteristics and can exhibit diverse impairments introduced when the training signals were captured or diverse artifacts introduced by a plurality of data enhancement models. The computer-readable instructions can also cause the system to provide an input signal to the plurality of quality estimation models, and to process the input signal with the plurality of quality estimation models to obtain a plurality of synthetic quality labels characterizing different characteristics of the input signal.

Another example includes a computer-readable storage medium. The computer-readable storage medium can store instructions which, when executed by a computing device, cause the computing device to perform acts. The acts can include obtaining audio data produced by a plurality of data enhancement models and obtaining quality labels for different characteristics of the audio data. The acts can also include using the audio data as training signals to train a plurality of different quality estimation models to estimate quality of at least two different signal characteristics based at least on the quality labels. The plurality of different quality estimation models can include a first quality estimation model trained to estimate effectiveness of the plurality of data enhancement models at removing a particular type of impairment and a second quality estimation model trained to estimate the extent to which the plurality of data enhancement models introduce artifacts into the training signals.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Overview

Figure 1:
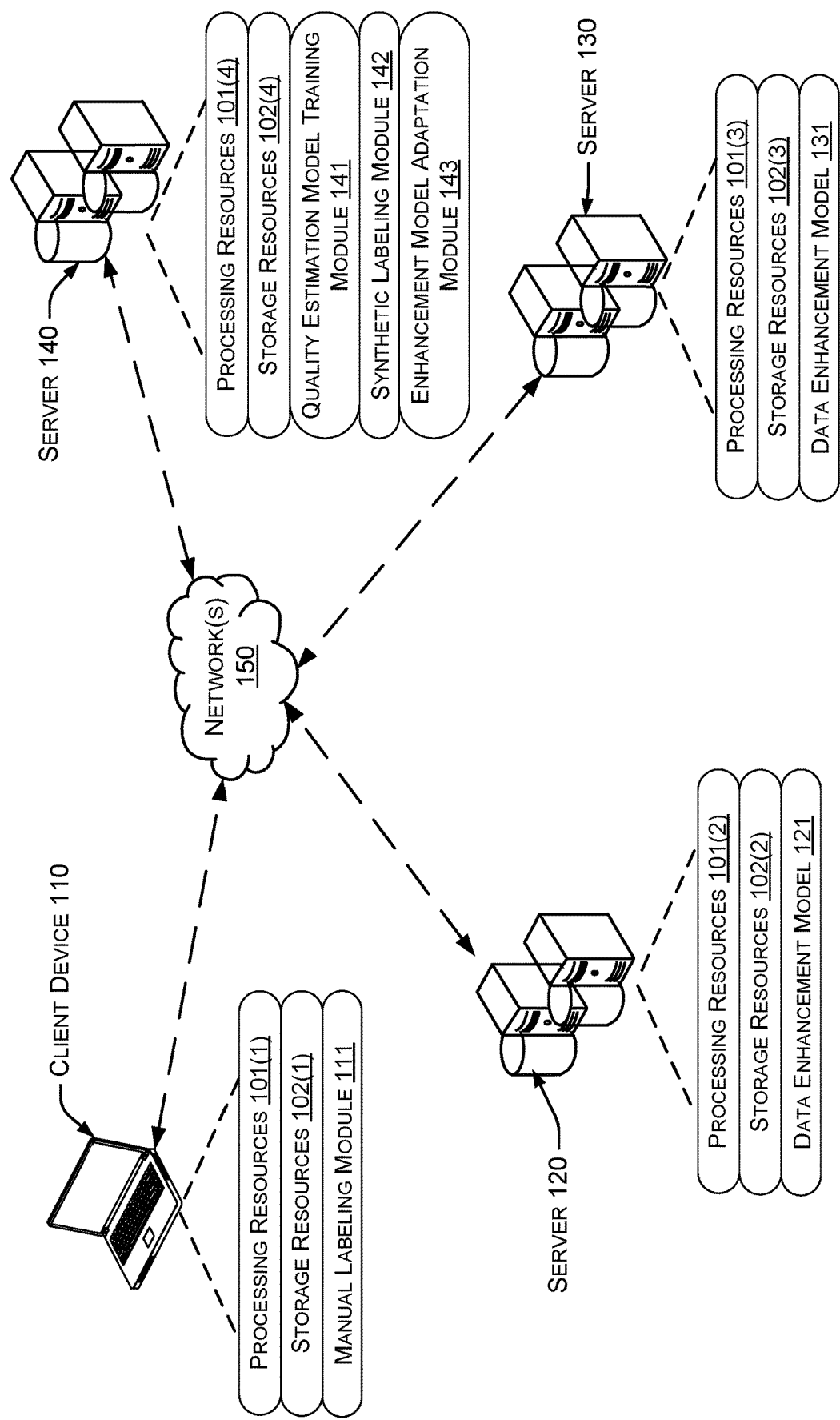
FIG. 1 illustrates an example system, consistent with some implementations of the present concepts.

The disclosed implementations generally offer techniques for producing quality estimation models that can be employed to estimate the quality of different characteristics of input signals. For instance, the input signal can be an audio, image, video, or other signal that has been digitally sampled and, in some cases, enhanced. The quality estimation models can be trained to estimate the quality of different signal characteristics, such as the quality of background noise or the speech quality of an audio signal. In some cases, a first quality estimation model can be employed to estimate the quality of a particular signal characteristic of an input signal, while a separate second quality estimation model can be employed to estimate the quality of other signal characteristics of that same input signal.

As discussed more below, once suitable quality estimation models have been trained, the quality estimation models can be used for various purposes. For instance, quality estimation models can be employed for automated estimation of signal quality, e.g., to detect a technical problem that may cause signal degradation and initiate a trouble ticket or other mechanism for fixing the problem. Quality estimation models can also be employed for producing synthetic quality labels that can be used to rank data enhancement models such as noise suppressors, image sharpeners, etc., relative to one another. The synthetic quality labels can also be employed for training of data enhancement models using a loss or objective function that considers synthetic labels produced by two or more quality estimation models, as discussed more below.

Definitions

For the purposes of this document, the term "signal" refers to a function that varies over time or space. A signal can be represented digitally using data samples, such as audio samples, video samples, or one or more pixels of an image. A "data enhancement model" refers to a model that processes data samples from an input signal to enhance the perceived quality of the signal. For instance, a data enhancement model could remove noise or echoes from audio data, or could sharpen image or video data. The term "signal characteristic" describes how a signal can be perceived by a user, e.g., the overall quality of the signal or a specific aspect of the signal such as how noisy an audio signal is, how blurry an image signal is, etc.

The term "quality estimation model" refers to a model that evaluates an input signal to estimate how a human might rate the perceived quality of the input signal for one or more signal characteristics. For example, a first quality estimation model could estimate the speech quality of an audio signal and a second quality estimation model could estimate the overall quality and/or background noise of the same audio signal. Audio quality estimation models can be used to estimate signal characteristics of an unprocessed or raw audio signal or a processed audio signal that has been output by a particular data enhancement model. The output of a quality estimation model can be a synthetic label representing the signal quality of a particular signal characteristic. Here, the term "synthetic label" means a label generated by a machine evaluation of a signal, where a "manual" label is provided by human evaluation of a signal.

The term "model" is used generally herein to refer to a range of processing techniques, and includes models trained using machine learning as well as hand-coded (e.g., heuristic-based) models. For instance, a machine-learning model could be a neural network, a support vector machine, a decision tree, etc. Whether machine-trained or not, data enhancement models can be configured to enhance or otherwise manipulate signals to produce processed signals. Data enhancement models can include codecs or other compression mechanisms, audio noise suppressors, echo removers, distortion removers, image/video healers, low light enhancers, image/video sharpeners, image/video denoisers, etc., as discussed more below.

The term "impairment," as used herein, refers to any characteristic of a signal that reduces the perceived quality of that signal. Thus, for instance, an impairment can include noise or echoes that occur when recording an audio signal, or blur or low-light conditions for images or video. One type of impairment is an artifact, which can be introduced by a data enhancement model when removing impairments from a given signal. Viewed from one perspective, an artifact can be an impairment that is introduced by processing an input signal to remove other impairments. Another type of impairment is a recording device impairment introduced into a raw input signal by a recording device such a microphone or camera. Another type of impairment is a capture condition impairment introduced by conditions under which a raw input signal is captured, e.g., room reverberation for audio, low light conditions for image/video, etc.

Machine Learning Overview

There are various types of machine learning frameworks that can be trained to perform a given task, such as estimating the quality of a signal or enhancing a signal. Support vector machines, decision trees, and neural networks are just a few examples of machine learning frameworks that have been used in a wide variety of applications, such as image processing and natural language processing. Some machine learning frameworks, such as neural networks, use layers of nodes that perform specific operations.

In a neural network, nodes are connected to one another via one or more edges. A neural network can include an input layer, an output layer, and one or more intermediate layers. Individual nodes can process their respective inputs according to a predefined function, and provide an output to a subsequent layer, or, in some cases, a previous layer. The inputs to a given node can be multiplied by a corresponding weight value for an edge between the input and the node. In addition, nodes can have individual bias values that are also used to produce outputs. Various training procedures can be applied to learn the edge weights and/or bias values. The term "internal parameters" is used herein to refer to learnable values such as edge weights and bias values that can be learned by training a machine learning model, such as a neural network. The term "hyperparameters" is used herein to refer to characteristics of model training, such as learning rate, batch size, number of training epochs, number of hidden layers, activation functions, etc.

A neural network structure can have different layers that perform different specific functions. For example, one or more layers of nodes can collectively perform a specific operation, such as pooling, encoding, or convolution operations. For the purposes of this document, the term "layer" refers to a group of nodes that share inputs and outputs, e.g., to or from external sources or other layers in the network. The term "operation" refers to a function that can be performed by one or more layers of nodes. The term "model structure" refers to an overall architecture of a layered model, including the number of layers, the connectivity of the layers, and the type of operations performed by individual layers. The term "neural network structure" refers to the model structure of a neural network. The term "trained model" and/or "tuned model" refers to a model structure together with internal parameters for the model structure that have been trained or tuned. Note that two trained models can share the same model structure and yet have different values for the internal parameters, e.g., if the two models are trained on different training data or if there are underlying stochastic processes in the training process.

Technical Effect of Separate Quality Estimation Models

One way to evaluate the quality of a given input signal is to have human users review the signal and evaluate the overall quality of the signal, e.g., on a scale of 1-5. However, manual labeling of signals does not scale well, e.g., it can be time-consuming, laborious, and expensive to obtain large-scale training data via manual labeling. One approach for mitigating this issue could be to use automated technologies, instead of human users, to label signals. For instance, a quality estimation model that could accurately replicate the performance of a human user at labelling the overall quality of input signals could drastically reduce the costs associated with training data enhancement models.

However, in some cases, the overall quality of an input signal may not provide sufficient information to achieve a given goal. For instance, human users tend to rate the overall quality of an audio signal very similar to their rating of the background noise of an audio signal. Thus, human quality label for the overall quality of an audio signal is a reasonable proxy for labels characterizing the background noise of a signal. On the other hand, human labels for the overall quality of an audio signal do not correlate well with human labels for the speech component of an audio signal. In other words, users can be inclined to rate the speech characteristic of a noisy input signal fairly high even while giving the input signal a low overall score, or to rate the speech characteristic of a relatively noiseless input signal fairly low even while giving the input signal a high overall score. Thus, overall quality labels are not necessarily suitable proxies for specifically labeling the speech quality of an input signal, and quality estimation models trained using only overall quality labels may be relatively inaccurate at evaluating the quality of specific signal characteristics.

Because overall quality labels may not convey sufficient information about specific characteristics of a signal, even a very accurate automated quality estimation model that estimates overall quality of a signal may be insufficient for specific applications. For instance, consider a noise suppressor being developed for a system that performs automated speech recognition on noise-reduced signals produced by the noise suppressor. Conventional noise suppressors tend to introduce artifacts that distort speech, and thus can negatively impact the accuracy of automated speech recognition. As previously noted, overall quality of an audio signal tends to be well-correlated with background noise removal and not very well-correlated with speech quality. Thus, a noise suppressor trained using only overall quality labels may tend to suppress noise well while destroying the speech signal. More generally, various types of data enhancement models may tend to introduce different types of artifacts when enhancing signals, and training such data enhancement models using only overall quality labels may be insufficient to train the data enhancement models to limit the extent to which such artifacts are introduced during data enhancement.

The disclosed implementations can separate the quality estimation of a given signal into separate signal characteristics and then train and employ separate quality estimation models to estimate the quality of the different signal characteristics. As a consequence, various application-specific goals can be achieved. For instance, the disclosed implementations can obtain manually-labeled training data that characterizes several different characteristics of a signal, e.g., the background noise, speech quality, and overall quality of noise-reduced audio signals that have been processed by a noise suppressor. Separate quality estimation models can be trained for subsets of one or more characteristics, e.g., a first quality estimation model can be trained and used to estimate speech quality, and a second quality estimation model can be trained and used to estimate overall and background noise quality. By using a separately-trained quality estimation model to produce synthetic quality labels representing speech quality to train a noise suppressor, the noise suppressor can be optimized not only for noise reduction, but also to preserve the quality of speech in a given signal. More generally, any characteristic of a given type of signal that is important for a given application scenario can be evaluated separately from the overall quality of that signal, e.g., using a separate quality estimation model for that characteristic. As a consequence, data enhancement models can be trained to target specific application scenarios by considering not only overall signal quality, but also the quality of the particular characteristic that is important for that application scenario.

Technical Effect of Training Quality Estimation Models Using Diverse Impairments Ideally, a quality estimation model would be both accurate and robust with respect to estimating one or more characteristics of a given signal. Here, accuracy refers to the ability of the quality estimation model to replicate human performance on a given dataset (e.g., produce similar labels), and robustness refers to the ability of the quality estimation model to retain consistent accuracy when exposed to new input signals that were not seen during training.

One issue complicating matters is that machine learning models can tend to overfit to a training dataset, and do not generalize well to unseen data. Thus, a quality estimation model trained on a single dataset may not perform well on other datasets. In other words, such a quality estimation model is not particularly robust.

To some extent, this issue arises in the data enhancement context because different enhancement techniques can tend to introduce different artifacts into enhanced data. Thus, a quality estimation model trained to recognize adverse effects of a first type of artifact produced by a first data enhancement model might not recognize other adverse effects from a second type of artifact produced by a second data enhancement model. In addition, recording device and capture condition impairments can also vary significantly. Thus, a quality estimation model trained to recognize impairments introduced by capturing raw input signals with specific recording devices or under specific conditions may not recognize other types of impairments introduced by other recording devices or recording conditions.

Another issue that has hampered the development of data enhancement models is that some approaches rely on access to an unimpaired reference signal. For instance, a lossy compression model could be evaluated by comparing the quality of the compressed signal to the raw, uncompressed signal. However, in many contexts, no unimpaired reference signals are available. For instance, a recording of a speaker in front of a live audience will tend to have significant amounts of noise and thus there is no unimpaired reference signal that can be used to train a noise removal model on such a recording, as the original recording itself has noise impairments.

The disclosed implementations aim to mitigate these issues by training multiple quality estimation models to estimate the quality of different characteristics of a signal and exposing each of the quality estimation models to a diverse range of impairments present in training signals. The impairments may be introduced when the training signals are captured and/or introduced as artifacts by one or more different data enhancement models. As a consequence, quality estimation models trained on a dataset such as disclosed herein can learn to recognize the quality of specific characteristics of a signal over a broad range of impairments in raw signals and/or artifacts introduced by various types of data enhancement models. Thus, such quality estimation models can generalize well to novel input data, such as processed signals produced by data enhancement models that were not used for initial training of the quality estimation model or raw input signals obtained using different recording devices, or under different recording conditions, than those used to train the quality estimation model.

Once quality estimation models have been trained in this manner, the quality estimation models can serve as a substitute for human evaluation for specific signal characteristics. Thus, for example, the quality estimation models can be used to generate vast amounts of synthetic labels for specific characteristics of raw or processed input signals without the involvement of a human user. Synthetic labels can be used to drastically increase the efficiency with which data enhancement models can be trained to reduce impairments in input signals.

Example System

The present implementations can be performed in various scenarios on various devices. FIG. 1 shows an example system 100 in which the present implementations can be employed, as discussed more below.

As shown in FIG. 1, system 100 includes a client device 110, a server 120, a server 130, and a server 140, connected by one or more network(s) 150. Note that the client devices can be embodied both as mobile devices such as smart phones or tablets, as well as stationary devices such as desktops, server devices, etc. Likewise, the servers can be implemented using various types of computing devices. In some cases, any of the devices shown in FIG. 1, but particularly the servers, can be implemented in data centers, server farms, etc.

Certain components of the devices shown in FIG. 1 may be referred to herein by parenthetical reference numbers. For the purposes of the following description, the parenthetical (1) indicates an occurrence of a given component on client device 110, (2) indicates an occurrence of a given component on server 120, (3) indicates an occurrence of a given component on server 130, and (4) indicates an occurrence of a given component on server 140. Unless identifying a specific instance of a given component, this document will refer generally to the components without the parenthetical.

Generally, the devices 110, 120, 130, and/or 140 may have respective processing resources 101 and storage resources 102, which are discussed in more detail below. The devices may also have various modules that function using the processing and storage resources to perform the techniques discussed herein. The storage resources can include both persistent storage resources, such as magnetic or solid-state drives, and volatile storage, such as one or more random-access memory devices. In some cases, the modules are provided as executable instructions that are stored on persistent storage devices, loaded into the random-access memory devices, and read from the random-access memory by the processing resources for execution.

Client device 110 can include a manual labeling module 111 that can assist a human user in labeling training signals with manual quality labels. For instance, the training signals can include images, audio clips, video clips, etc. In some cases, the human users evaluate training signals produced by using data enhancement model 121 on server 120 and data enhancement model 131 on server 130 to enhance raw input signals. Thus, the manual quality labels provided by the user can generally characterize how effective the respective enhancement models are at enhancing the raw input signals. In other cases, the manual quality labels can characterize the quality of unprocessed (e.g., raw or unenhanced) training signals. The manual quality labels can represent the overall quality of the signals and/or the quality of specific signal characteristics. For audio signals, the manual quality labels can reflect overall audio quality, background noise, echoes, quality of speech, etc. For video signals, the manual quality labels can reflect overall video quality, image segmentation, image sharpness, etc.

Quality estimation model training module 141 on server 140 can train different quality estimation models using the manual quality labels for different signal characteristics of the training signals. For instance, a first quality estimation model can evaluate the training signals and output synthetic quality labels that convey the speech quality of the training signals, as estimated by the first quality estimation model. A second quality estimation model can evaluate the training signals and output synthetic quality labels that convey the overall quality, background noise, and or speech quality of the training signals. Note that the same training signals but different quality labels can used to train the different models, e.g., the first quality estimation model can be trained without evaluating the background noise or overall quality of the training signals that are used to train the second quality estimation model. The quality estimation model training module can modify internal parameters of each quality estimation model based on the difference between the manual quality labels provided by the human users and the synthetic quality labels output by the first and second quality estimation models. For instance, in neural network implementations, a loss function can be defined to calculate a loss value that is propagated through one or more layers of each quality estimation model. The loss function can be proportional to the difference between the synthetic quality labels output by a given quality estimation model and the manual quality labels.

Once each quality estimation model is trained, synthetic labeling module 142 can label input signals with synthetic labels using the trained quality estimation models. For instance, a training corpus can be generated by processing a large number of unlabeled input signals using the quality estimation models. In other cases, the synthetic labeling module can be used to label input signals for other purposes, such as real-time feedback on audio or video quality of a call. The synthetic labels produced by one quality estimation model can characterize different characteristics than those produced by another. As noted, for instance, a first quality estimation model can produce synthetic labels characterizing speech quality of an audio signal, and a second quality estimation model can produce synthetic labels characterizing background noise quality and overall quality of an audio signal.

Enhancement model adaptation module 143 can use the synthetic labels provided by synthetic labeling module 142 to train or otherwise modify a new data enhancement model. For instance, for a neural network-based data enhancement model, the enhancement model adaptation module can adjust internal model parameters such as weights or bias values, or can adjust hyperparameters, such as learning rates, the number of hidden nodes/layers, momentum values, batch sizes, number of training epochs/iterations, etc. The enhancement model adaptation model can also modify the architecture of such a model, e.g., by adding or removing individual layers, densely vs. sparsely connecting individual layers, adding or removing skip connections across layers, etc. In some cases, the enhancement model is evaluated using a loss function that considers synthetic labels output by multiple different quality estimation models, e.g., speech quality synthetic labels output by a first quality estimation model and overall and background quality synthetic labels output by a second quality estimation model.

Example Method

Figure 2:
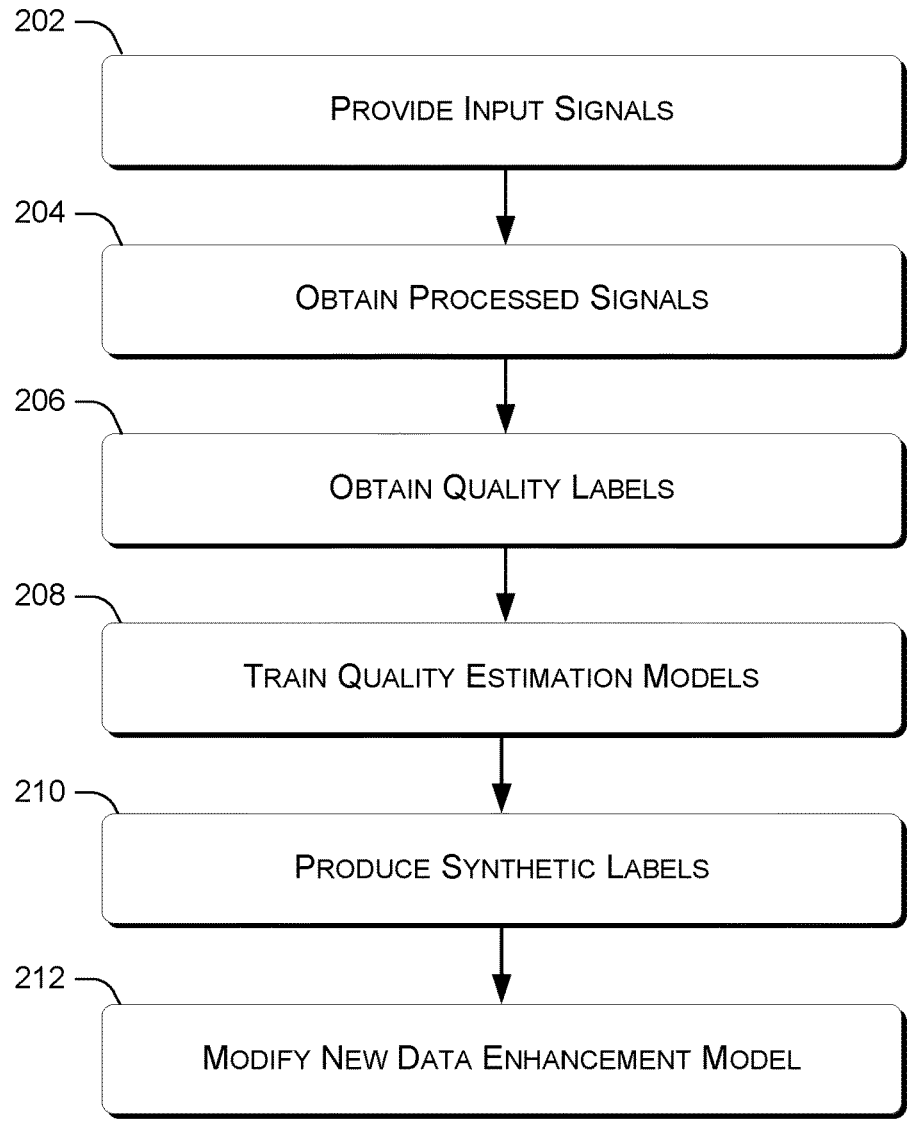
FIG. 2 illustrates an example method or technique for training and employing quality estimation models, consistent with some implementations of the present concepts.

FIG. 2 illustrates an example method 200, consistent with some implementations of the present concepts. Method 200 can be implemented on many different types of devices, e.g., by one or more cloud servers, by a client device such as a laptop, tablet, or smartphone, or by combinations of one or more servers, client devices, etc.

Method 200 begins at block 202, where input signals are provided to a plurality of data enhancement models that enhance the input signals using different techniques. As noted, the input signals can include raw or unenhanced images, audio clips, video clips, etc.

Method 200 continues at block 204, where processed signals are obtained. The processed signals can be output by the data enhancement models, and the processed signals can exhibit diverse artifacts introduced by the different processing performed by the data enhancement models. For instance, the processed signals can include digitally-enhanced or compressed images, video clips, or audio clips.

Method 200 continues at block 206, where quality labels are obtained for training signals, where the training signals can include the input signals and/or the processed signals obtained at block 204. For instance, the quality labels can be provided via manual evaluation of different characteristics of the training signals. For a given input signal, the quality labels can characterize multiple characteristics of that input signal, as discussed elsewhere herein. For processed signals, the quality labels characterize quality of the processed signals without reference to the input signals (e.g., on a scale of 1 to 5). In other cases, the quality labels characterize the extent to which the processed signals are enhanced relative to the input signals, e.g., if the original signal is rated by a user as having a quality of 1 for a particular characteristic and the processed signal is rated by the user as having a quality of 3 for that characteristic, the quality label indicates an improvement of two points for that particular characteristic.

Method 200 continues at block 208, where different quality estimation models are trained to estimate quality of at least two different signal characteristics using the training signals and the quality labels. As noted elsewhere herein, each quality estimation model can be provided using various machine learning approaches including, but not limited to, convolutional deep neural networks. In some cases, the quality estimation models can be otherwise identical neural networks that have different output layers to predict the different signal characteristics.

Method 200 continues at block 210, where synthetic quality labels are produced for other input signals using the trained quality estimation models. For instance, the other input signals can be processed signals output by a new data enhancement model, where "new" means that the new data enhancement model was not used to train the quality estimation models in block 208 of method 200. The other input signals can also include raw or unenhanced signals. The synthetic quality labels output by a first one of the trained quality estimation models can characterize different signal characteristics than the synthetic quality labels output by a second one of the trained quality estimation models.

Method 200 continues at block 212, where the new data enhancement model is modified. For instance, the synthetic labels characterizing the different signal characteristics can be used to evaluate processed signals output by the new data enhancement model. Internal parameters, hyperparameters, and/or an architecture of the new data enhancement model can be modified based on the synthetic labels. In some cases, a loss or objective function is employed that includes terms representing the synthetic labels for at least two different signal characteristics as estimated by the at least two different quality estimation models.

Blocks 202, 204, 206, and 208 of method 200 can be performed by quality estimation model training module 141. Block 210 of method 200 can be performed by synthetic labeling module 142. Block 212 of method 200 can be performed by enhancement model adaptation module 143.

Quality Estimation Model Details

In some implementations, the input signals provided to the data enhancement models at block 202 include raw (e.g., unenhanced) images, audio clips, or video clips. For audio clips, the data enhancement models can include any of noise removal models, echo removal models, device distortion removal models, codecs, or models for addressing quality degradation caused by room response, or network loss/jitter issues. For images or video clips, the data enhancement models can include any of image/video healing models, low light enhancement models, image/video sharpening models, image/video denoising models, codecs, or models for addressing quality degradation caused by color balance issues, veiling glare issues, low contrast issues, flickering issues, low dynamic range issues, camera jitter issues, frame drop issues, frame jitter issues, and/or audio video synchronization issues.

In some implementations, quality estimation models and/or data enhancement models can be provided as machine learning models, such as deep neural networks. Quality estimation models can be used to produce synthetic labels for training examples that can then be used to modify other data enhancement models. For instance, as noted previously, internal parameters, hyperparameters, and/or architectures of data enhancement models can be adjusted using the synthetic labels. In some cases, the synthetic labels can characterize the effectiveness of data enhancement models at removing a particular type of impairment, e.g., a noise quality label for a noise suppressor. In addition, synthetic quality labels can characterize the extent to which a given data enhancement model introduces artifacts that affect a particular characteristic of a given signal, e.g., a speech quality label can reflect the extent to which a noise suppressor distorts speech when reducing noise.

Quality estimation models can also be used to rank data enhancement models relative to one another, e.g., based on synthetic labels produced by the quality estimation models when evaluating processed signals output by multiple data enhancement models on the same set of input signals. In some cases, the ranking function can weight the contribution of synthetic labels for different signal characteristics differently, e.g., the speech quality label may be weighted more heavily than the background noise label when ranking the models for a speech recognition application. Conversely, the background noise label may be weighted more heavily than the speech quality label for a different application where speech quality is less important than low background noise.

In some cases, the human labels and/or synthetic labels rate the quality of a given processed signal with reference to the input (e.g., raw) signals from which that processed signal was derived. In this case, the human and/or synthetic labels reflect the extent to which the enhancement improved the quality of a particular characteristic of the input signal. In other cases, the human and/or synthetic labels can characterize the processed signal without considering the input signal from which the processed signal is derived. In addition, a quality estimation model can be trained using the disclosed techniques without access to an unimpaired reference signal.

Quality Estimation Model Structure with Single Output Layer

Figure 3:
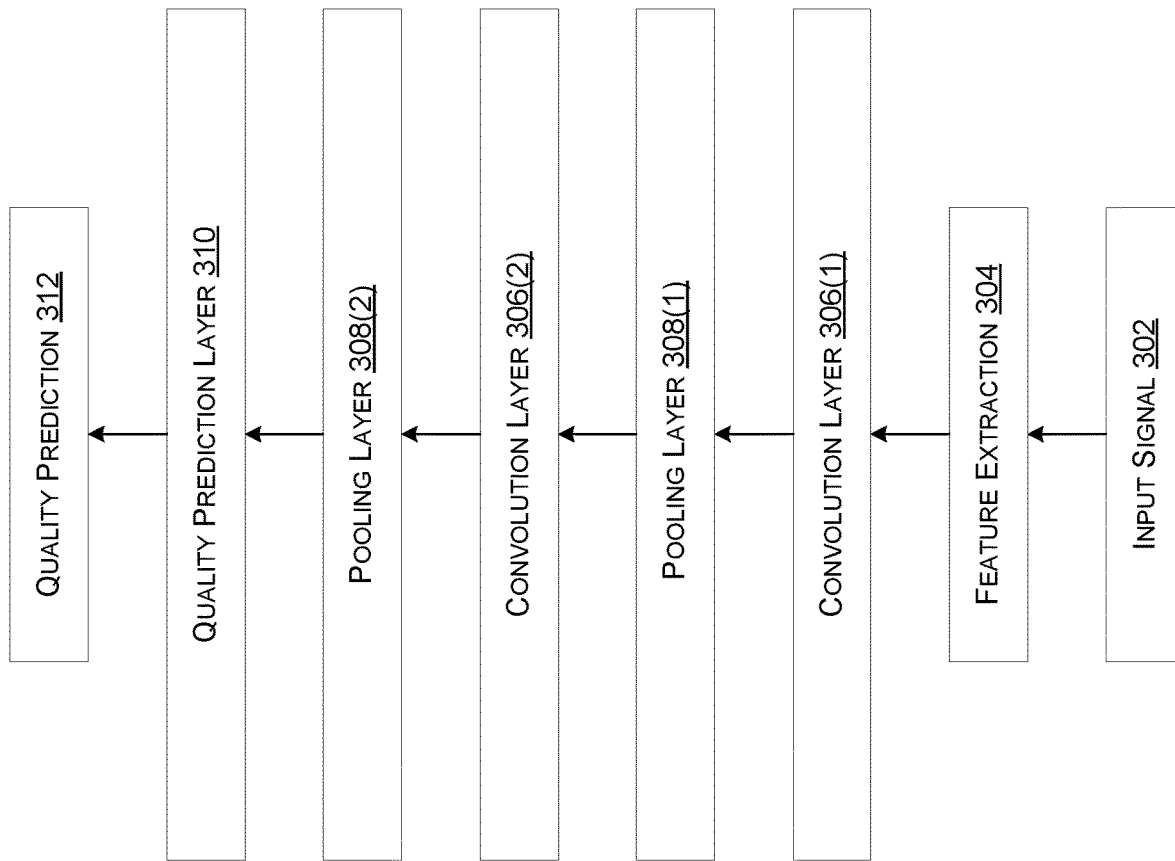
FIG. 3 illustrates a first example quality estimation model, consistent with some implementations of the disclosed techniques.

FIG. 3 illustrates an example structure of a quality estimation model 300, consistent with some implementations of the present concepts. The quality estimation model receives an input signal 302 that undergoes feature extraction 304. Extracted features are input to a group of intermediate layers, e.g., first to a convolution layer 306(1), which outputs values to a pooling layer 308(1). The output of pooling layer 308(1) is input to another convolution layer 306(2), which outputs values to another pooling layer 308(2). The output of pooling layer 308(2) is processed by a quality prediction layer 310, which is an output layer that produces a quality prediction 312 for a specific characteristic of the input signal, e.g., speech quality.

In some cases, the quality prediction layer 310 can output a statistical distribution, e.g., a likelihood for one of a discrete number of quality options. For instance, the quality options can be binary, e.g., positive or negative, and the quality prediction 312 can be a statistical distribution such as a 70% likelihood of a positive quality or 30% likelihood of a negative quality for a given input signal. As another example, assuming a discrete set of five possible quality labels (e.g., from one to five stars), the quality prediction can be a statistical distribution such as a 10% likelihood of five stars, 70% likelihood of four stars, 10% likelihood of three stars, 8% likelihood of two stars, and 2% likelihood of one star. In other implementations, the output prediction can be a continuous value, e.g., a floating-point value such as 3.2 stars, 4.1 stars, etc.

As noted, a quality estimation model can be employed to evaluate the quality of audio clips. In such a case, feature extraction 304 can involve vectorization of a time domain waveform representing the audio clip. However, this results in a very large input dimension. In other implementations, spectral-based features, such as log power spectrum or log power Mel spectrogram input features, can be extracted from the audio clip. Some implementations use a frame size of 20 ms with hop length of 10 ms.

Quality Estimation Model Structure with Multiple Output Layers

Figure 4:
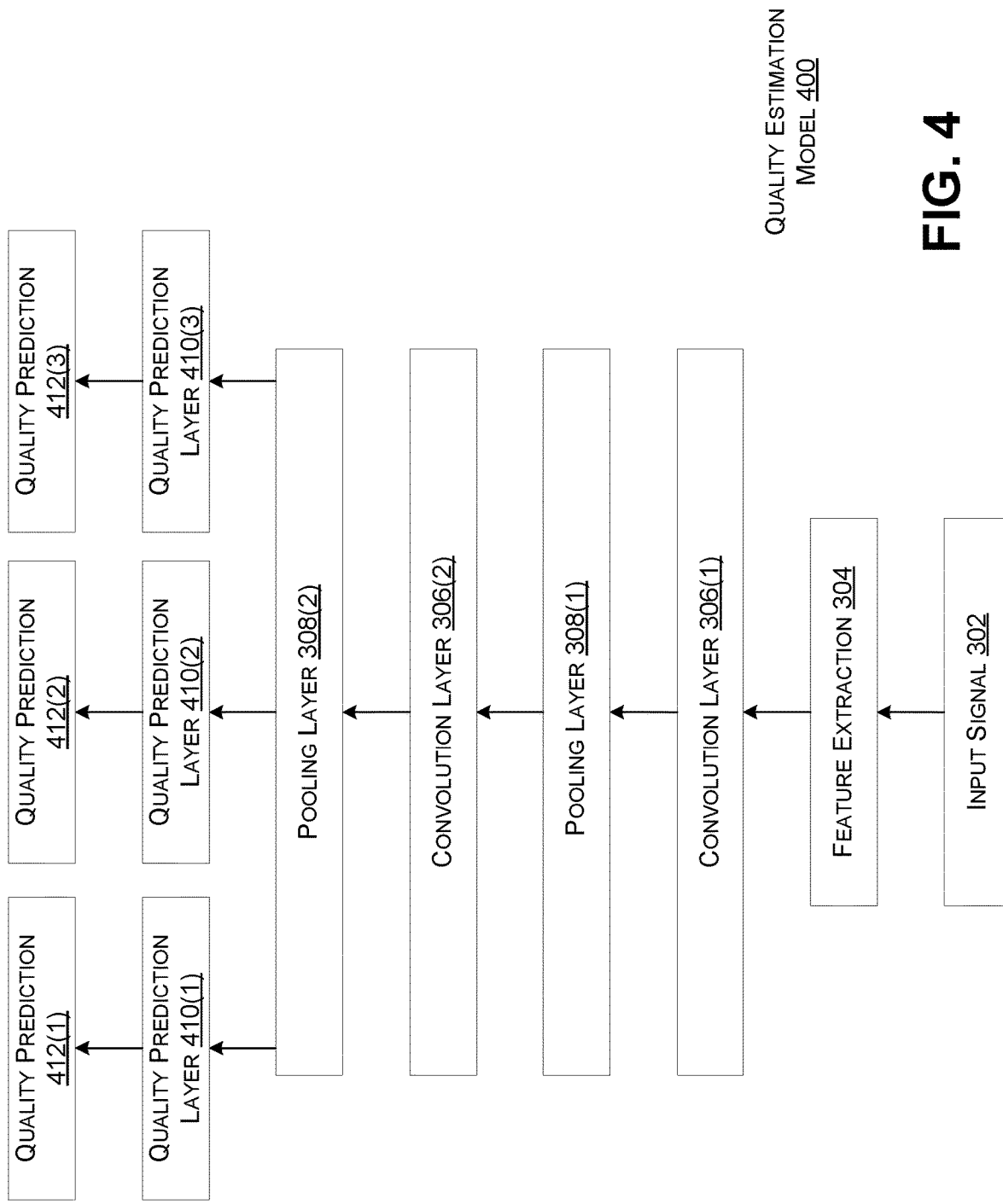
FIG. 4 illustrates a second example quality estimation model, consistent with some implementations of the disclosed techniques.

FIG. 4 illustrates an example structure of a quality estimation model 400, consistent with some implementations of the present concepts. Quality estimation model 400 can be identical to quality estimation model 300 with the exception of having three output layers, quality prediction layers 410(1), 410(2), and 410(3), respectively. Each quality prediction layer can output respective quality predictions 412(1), 412(2), and 412(3), e.g., synthetic labels for a particular characteristic of input signal 302. For instance, quality prediction layer 410(1) can output a synthetic label characterizing background noise, quality prediction layer 410(2) can output a synthetic label characterizing overall quality, and quality prediction layer 410(3) can output a synthetic label characterizing speech quality. As discussed more below, the synthetic labels representing speech quality produced by quality estimation model 400 can be discarded in favor of those produced by quality estimation model 300.

Example Overall Quality Estimation Model

As discussed more below, different quality estimation models can be provided to evaluate processed signals produced by different types of data enhancement models. For instance, a first set of quality estimation models can be trained to estimate different characteristics of processed signals produced by various noise suppression models, a second set of quality estimation models can be trained to estimate different characteristics of processed signals produced by various echo removal models, and so on. Thus, the first set could include a dedicated quality estimation model trained to measure speech quality on noise-reduced signals and another quality estimation model trained to measure overall quality and background noise quality on noise-reduced signals. The second set could include other quality estimation models trained to measure quality of different characteristics of echo-reduced signals.

The outputs of the respective sets of quality estimation models can be combined to produce an overall quality rating for a given processed signal. In other implementations, an overall quality estimation model is provided with individual quality estimation models as constituent components of the overall quality estimation model For instance, one or more intermediate layers of a neural network may be trained to evaluate the quality of different characteristics of processed signals that have undergone noise suppression, one or more other intermediate layers may be trained to evaluate the quality of different characteristics of processed signals that have undergone evaluate echo cancellation processing, and so on. Such an overall quality estimation model may have another layer that combines values from these intermediate layers to provide a final, overall assessment of quality of a given processed signal, as discussed more below.

Figure 5:
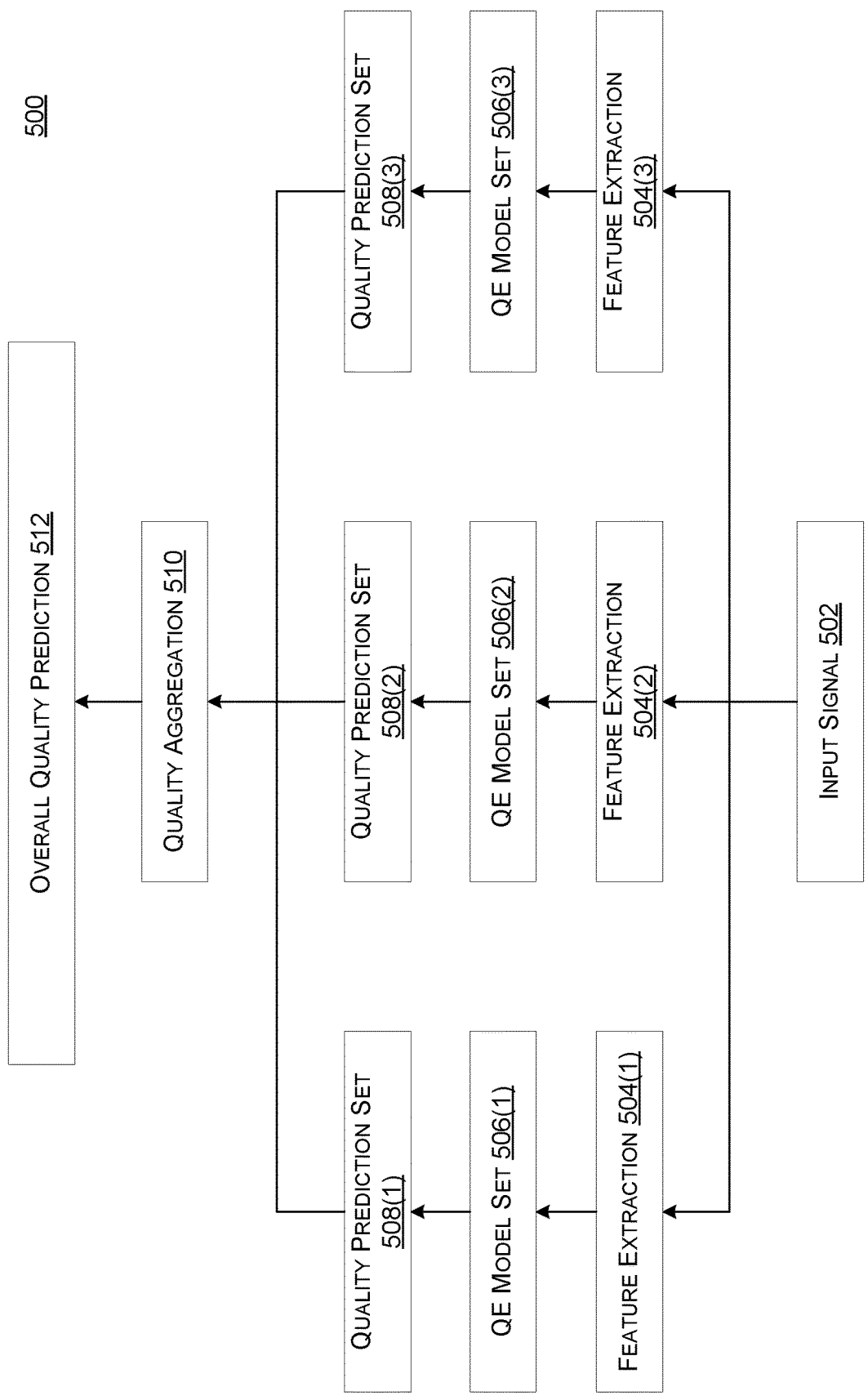
FIG. 5 illustrates an example overall quality estimation model, consistent with some implementations of the present concepts.

FIG. 5 illustrates an example structure of an overall quality estimation model 500, consistent with some implementations of the present concepts. The overall quality estimation model receives an input signal 502 and feeds the input signal into three feature extraction stages 504(1), 504(2), and 504(3). Note that the input signal can be a processed signal that was produced by a data enhancement model by processing another input signal. Thus, the term "input signal" as used herein is from the perspective of the model processing the signal.

Extracted features are input into three individual quality estimation model sets 506(1), 506(2), and 506(3). Each individual quality estimation model set can include one or more quality estimation models that outputs a corresponding quality prediction set 508(1), 508(2), and 508(3). For instance, quality estimation model set 506(1) can include two separate models, one of which provides one label in quality prediction set 508(1) (e.g., speech quality) and a second of which provides two labels in quality prediction set 508(1) (e.g., background and overall quality). More generally, each quality estimation model set can include a specified number of quality estimation models trained on the same set of training data to produce different labels. The individual quality prediction sets 508(1), 508(2), and 508(3) can be input to quality aggregation 510, which produces an overall quality prediction 512 representing the predicted overall quality for the input signal.

Each of the individual quality estimation model sets 506(1), 506(2), and 506(3) can be trained to recognize artifacts introduced by different types of data enhancement models. For instance, in an audio context, quality estimation model set 506(1) can include a first set of models trained to predict different quality characteristics using processed signals produced by numerous noise removal models. Quality estimation model set 506(2) can include a second set of models trained to predict different quality characteristics using other processed signals produced by numerous echo removal models. Quality estimation model set 506(3) can include a third set of models trained to predict different quality characteristics on further processed signals produced by numerous distortion removal models.

In some cases, an individual quality estimation model within a given set can share part or all of a model structure with other models within that set, while having different structures from models in other sets. For instance, the noise removal quality estimation models could be otherwise identical convolutional neural networks with differing output layers (e.g., refer to above discussion regarding FIG. 3 and FIG. 4). Similarly, the echo removal quality estimation models could be otherwise identical recurrent neural networks with different output layers, and the distortion removal quality estimation models could be convolutional neural networks with a different structure than the noise removal quality estimation models, e.g., different window sizes, fewer or more convolutional layers, etc. In addition, note that some implementations may employ individual quality estimation models or sets thereof that are trained to recognize recording devices or capture condition impairments as described elsewhere herein.

Generally, quality aggregation 510 can involve employing a function that determines the relative contribution of each individual quality prediction within each quality prediction set to arrive at the overall quality prediction 512. In some cases, the aggregation can involve applying a linear or nonlinear function to weight each individual quality prediction, including overall quality predictions as well as quality predictions for specific signal characteristics. The aggregation function can be learned using machine learning or can be based on one or more heuristics. In some cases, the quality aggregation can be performed using one or more neural network layers that are trained separately from the individual quality estimation models. In other cases, one or more of the individual quality estimation models can be trained together with the quality aggregation layer(s).

To train overall quality estimation model 500, some implementations may employ characteristic-specific manual quality labels to train each individual quality estimation model, as well as overall manual quality labels. For instance, consider audio clips that have undergone noise removal, echo removal, and distortion removal to generate a third processed audio signal. In some cases, a human user can provide first manual quality labels for different characteristics of the audio signals after noise removal, second manual quality labels for different characteristics of the audio signals after echo removal, third manual quality labels for different characteristics of the audio signals after distortion removal, and fourth manual quality labels for different characteristics of final audio signals that have undergone all three enhancements. In this manner, the overall quality estimation model can be provided with training data that reflects the relative contribution of each type of enhancement to how human users perceive the overall quality of a given audio clip.

Training Data Distributions

As previously noted, different data enhancement models can tend to produce processed signals that are perceived differently by human users. As a consequence, the manual quality labels provided for such processed signals can have varying underlying distributions. For instance, consider a noise removal model A with manual quality labels for the speech characteristic concentrated at the low end on a scale of 1-5, e.g., 80% of processed signals with speech rated 2 or lower by human users. Another noise removal model B might have manual quality labels for background noise quality concentrated at both the low end and the high end of the scale, with relatively few manual quality labels for background noise quality falling in the middle of the scale, e.g., 80% of manual labels being either a 1 or a 5 and only 20% of labels between 2-4.

It can be useful to have an approximately uniform distribution of quality labels for each separate signal characteristic that a quality estimation model is trained to predict, because this exposes the quality estimation model to a wide range of signal quality during training. Thus, some implementations may sample processed signals output by each data enhancement model to achieve a relatively uniform distribution for each signal characteristic. Continuing with the previous examples, some implementations can sample training examples of processed signals output by noise removal models A and B so that the training set has a relatively uniform distribution of labels for each characteristic.

Since noise removal model A has manual quality labels for the speech characteristic concentrated at the low end of the rating scale, training examples from noise removal model A may be sparsely sampled from the low end of the rating scale for the speech characteristic and more heavily sampled toward the middle and upper ends of the scale for the speech characteristic to achieve a relatively more even distribution for training a quality estimation model. Likewise, since noise enhancement model B has manual quality labels for background noise concentrated at the low and high ends of the scale, training examples from noise removal model B might be sampled more heavily from the middle of the rating scale for the background noise characteristic and more sparsely from the low and high ends of the rating scale to achieve a relatively more even distribution of training examples.

Referring back to FIG. 2, in some cases, block 204 of method 200 can involve sampling from manually-labeled training examples as described above to obtain a relatively uniform distribution of quality labels for each evaluated signal characteristic, as described above.

Enhancement Model Selection Criteria

As noted, the disclosed implementations can expose quality estimation models to a broad range of artifacts during training, as this generally improves robustness of the trained quality estimation models. On the other hand, sometimes different data enhancement models produce very similar artifacts. When many training examples are obtained with very similar artifacts, the training examples may be somewhat redundant and additional benefit may not be obtained from further training on redundant training examples. Furthermore, in some cases, a quality estimation model can be overfit to the training data set, particularly if a particular type of artifact that impacts a particular signal characteristic is substantially overrepresented in the training data.

To address these issues, some implementations can use artifact classification to select particular data enhancement models to use for training the quality estimation model. For instance, audio data enhancement models can have processing characteristics that introduce phase distortion artifacts, compression artifacts, high frequency distortion artifacts, harmonic artifacts, etc. Thus, some implementations may ensure that each type of artifact is adequately represented in the training data set, e.g., by ensuring that a threshold number of data enhancement models that produce each type of artifact is used to obtain training data. For instance, some data enhancement models work only on the magnitude spectrum and thus generally do not introduce phase distortions, whereas data enhancement models that work either (a) in the magnitude and phase domains or (b) in time domain can introduce phase distortions. Thus, some implementations can preferentially select certain data enhancement models for training based on the domain that they work in, to ensure that data enhancement models that work in each domain are adequately represented in the training data for each quality estimation model. Referring back to FIG. 2, in some cases, block 204 of method 200 can involve automated or manual classification of individual data enhancement models for the types of artifacts that they produce, and selecting specific data enhancement models from a larger set of candidate data enhancement models for training a quality estimation model. The selection can be based on the classified artifacts, and can exclude data enhancement models that tend to produce artifacts that are already well-represented by the data enhancement models that have already been selected to train the quality estimation model. Thus, for instance, each quality estimation model can be exposed during training to scenarios where a specific type of artifact impacts a specific signal characteristic.

Another mechanism for determining whether a given data enhancement model should be used for training involves determining whether performance of the quality estimation model improves when trained on training examples produced using that data enhancement model. One way to determine the extent, if any, to which training on a given data enhancement model improves the quality estimation model is to calculate the Pearson and/or Spearman correlation values between synthetic labels produced by the quality estimation model after training on that data enhancement model and manual quality labels for any particular signal characteristic. If the Pearson and/or Spearman correlation values between the synthetic and manual labels increase for a specific signal characteristic, then training examples produced by that data enhancement model can be added to the training set for the quality estimation model used to predict that particular signal characteristic, and if not, those training examples can be discarded.

Input Signal Selection

As discussed above, it is useful for quality estimation models to be exposed to a broad range of artifacts during training. In addition, quality estimation models can also benefit from being exposed to training examples that exhibit a broad range of other characteristics besides artifacts introduced during enhancement. For instance, in the case of speech data, it can be useful to train on speech that is relatively equally distributed among speakers of both genders. Likewise, it can be useful to train on speech from speakers from a broad range of ages, to train on speech exhibiting different ways of conveying emotions (e.g., crying, yelling, singing, etc.), as well as on speech in different languages (e.g., tonal vs. non-tonal). By exposing a quality estimation model that evaluates the quality of speech to such a broad range of speech data during training, the quality estimation model may be robust when employed for speakers of different languages, ages, genders, and emotions. This can also be useful even for quality estimation models used for other purposes, e.g., to evaluate overall audio quality, as human perception of overall audio quality is influenced by speech quality to some extent.

In addition, it can be beneficial for the quality estimation model to train on different types of impairments. Thus, some implementations may start with raw input signals. Some of these raw input signals may be very high-quality, e.g., from a speaker recorded in a quiet room with a high-quality microphone, whereas others may have inherent speech distortion, background noise, and/or reverberations. Some implementations may sample from the clean signals based on criteria such as manual quality labels, e.g., by selecting the top quartile of raw speech signals to use for subsequent training.

Next, impairments can be selected to be introduced to the raw input signals. Impairments can often be classified into different classes. For instance, given a corpus of audio clips with examples of noise, some implementations can process the corpus to filter out any examples with speech. The remaining audio clips can include noises such as fans, air conditioners, typing, doors being shut, clatter noises, cars, munching, creaking chairs, breathing, copy machines, babies crying, dogs barking etc. Next, synthetic clips can be generated by mixing the raw input signals with the noise clips.

A training data set for training a quality estimation model can be provided with (1) synthetic clips with added noise, (2) synthetic clips with added noise and added reverb, and (3) real recordings where noise and/or reverberations occur in the raw input signals, e.g., the original recordings. These "naturally" noisy and/or reverberant clips can be helpful because the noise/reverberations are captured with the same acoustic conditions, and with the same microphone, as the original speech. Thus, the synthetic clips generally allow a quality estimation model to be trained with different types of noise that may not be adequately represented in the real recordings, whereas the real recordings allow the quality estimation model to be trained with noisy and/or reverberant examples where the noise and reverberation are captured under the same conditions as the speech itself. As a consequence, each quality estimation model can accurately predict the quality of a given characteristic of a signal under a wide range of conditions.

Example Training Data Flow for Quality Estimation Model

Figure 6:
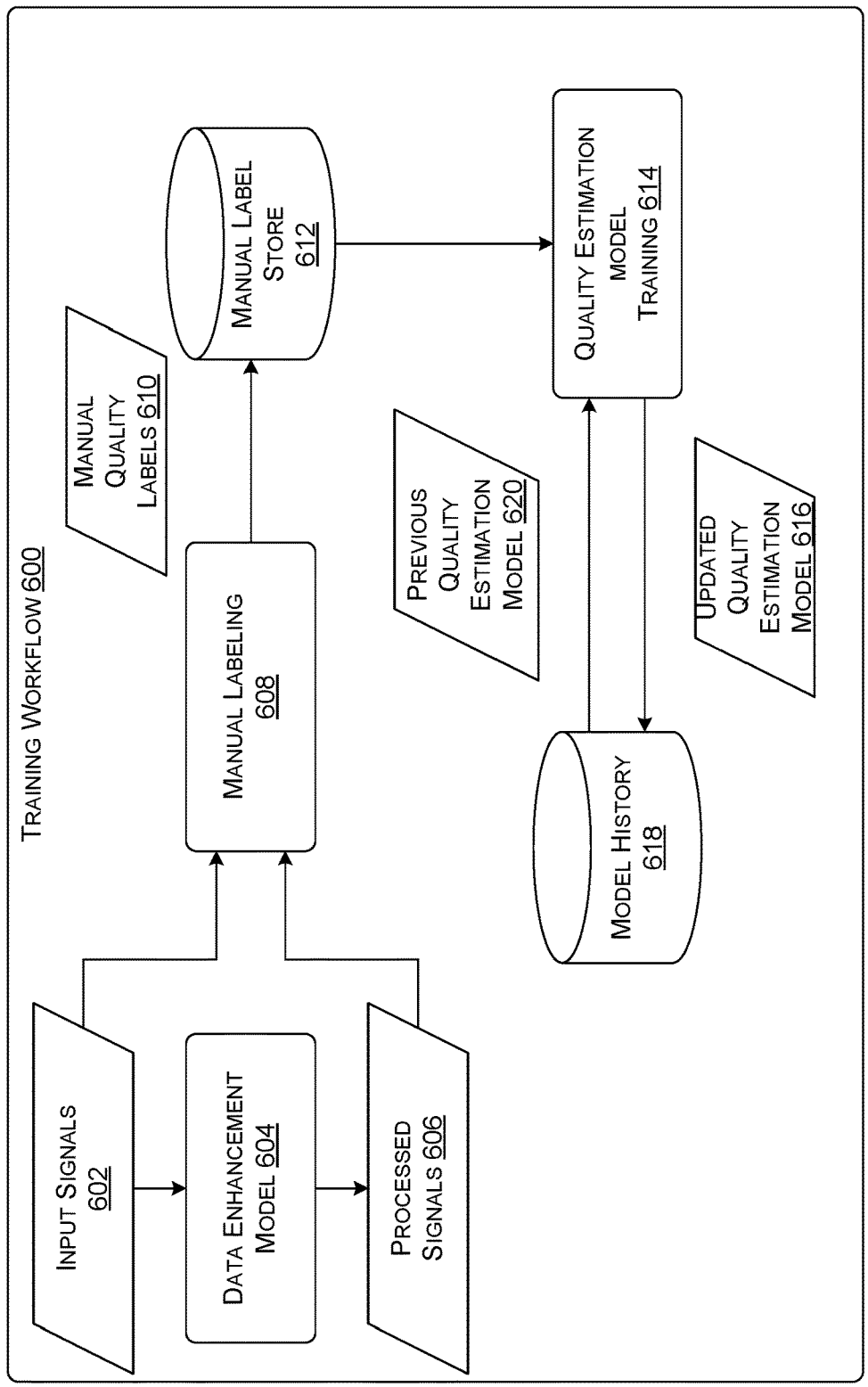
FIG. 6 illustrates an example workflow for training quality estimation models, consistent with some implementations of the present concepts.

FIG. 6 illustrates an example training workflow 600 for training a single quality estimation model, consistent with some implementations of the present concepts. Training workflow 600 can be employed multiple times to obtain different quality estimation models for different signal characteristics, as discussed elsewhere herein.

Input signals 602 are input to a data enhancement model 604. The data enhancement model produces processed signals 606. Manual labeling 608 is performed on the input signals and/or processed signals (potentially with reference to the input signals) to obtain manual quality labels 610, which convey the perceived quality of one or more characteristics of the input signals or the processed signals produced by the data enhancement model. The manual quality labels are used to populate a manual label store 612.

Quality estimation model training 614 proceeds using the manual quality labels 610 in the manual label store 612. Multiple iterations of training can be performed, with internal parameters of the quality estimation model being adapted at each iteration to obtain an updated quality estimation model 616, which is then output to a model history 618. The next training iteration can proceed by retrieving the previous quality estimation model 620 from the model history and continuing with training iterations. Note that a given quality estimation model can be trained using manual labels for a particular characteristic that the model is not used to predict, as discussed elsewhere herein with respect to using speech quality labels to train a quality estimation model that is used to predict background noise quality and overall quality, but not speech quality. In other cases, a given quality estimation model can be trained using only manual labels for a specific characteristic that the model is intended to predict, e.g., training a dedicated speech quality model using only manual speech quality labels.

Training workflow 600 can be performed for multiple iterations using training signals, including the input signals 602 and/or processed signals produced by multiple data enhancement models. In some cases, quality estimation model training 614 is performed until a stopping condition is reached, e.g., the quality estimation model converges, the quality estimation model achieves a threshold accuracy on a test data set, a training budget is exhausted, and/or all the examples in the manual label store 612 have been exhausted.

When training workflow 600 is performed on training examples for subsequent data enhancement models, in some cases the same input signals 602 are employed. However, different data enhancement models will output different processed signals 606 and the different processed signals will often have different manual quality labels assigned by users.

Example Data Enhancement Models

Figure 7:
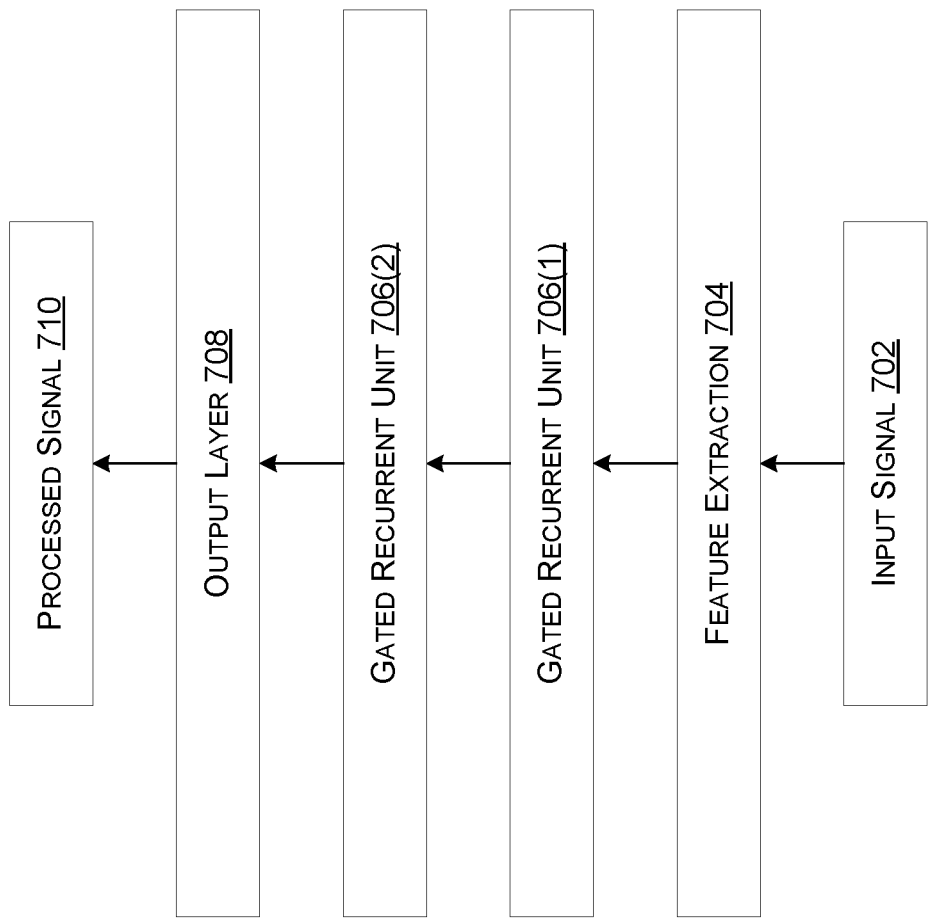
FIG. 7 illustrates an example initial data enhancement model, consistent with some implementations of the disclosed techniques.

FIG. 7 illustrates an example data enhancement model 700, consistent with some implementations of the present concepts. An input signal 702 is input to feature extraction 704, where features are extracted. In the case of an audio signal, the features can include short-term Fourier features, log-power spectral features, and/or log power Mel spectral features which can be extracted. A gated recurrent unit 706(1) can process the extracted features and provide output to another gated recurrent unit 706(2). The output of gated recurrent unit 706(2) can be input to an output layer 708 that produces a processed signal 710.

As noted previously, a data enhancement model can be trained using synthetic labels for different signal characteristics as described herein, e.g., to adjust internal model parameters. In some cases, data enhancement models can be adapted in other ways, e.g., by changing the architecture of the model. In some cases, a loss or objective function can be defined over different labels for different characteristics predicted by different models. For instance, a noise suppression model could have a loss function that considers synthetic speech quality labels produced by a model with a single output layer and synthetic background and overall quality labels produced by another model with multiple output layers.

Figure 8:
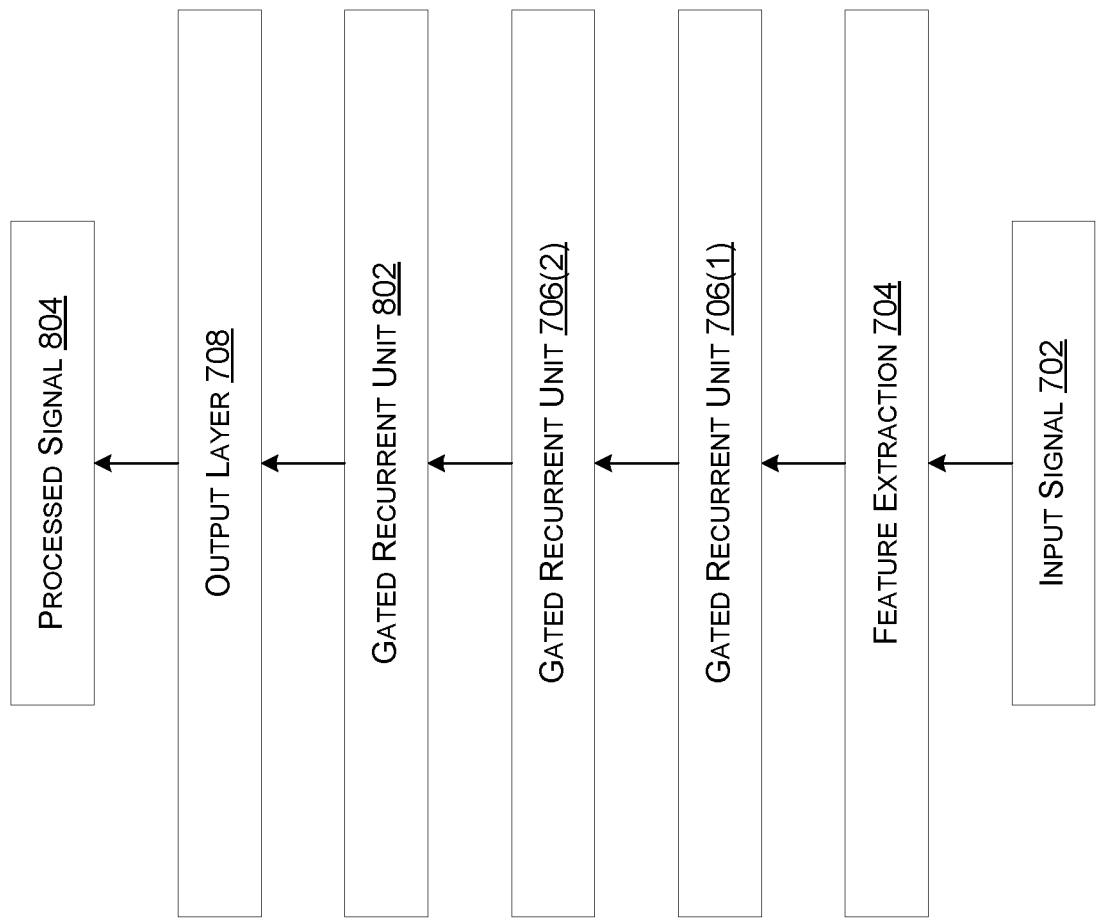
FIG. 8 illustrates an example modified data enhancement model, consistent with some implementations of the disclosed techniques.

FIG. 8 illustrates an example adapted data enhancement model 800, consistent with some implementations of the present concepts. The adapted data enhancement model is similar to data enhancement model 700, with the addition of a new gated recurrent unit 802 and processed signal 804, to convey that the adapted data enhancement model can produce a different processed signal than data enhancement model 700 given the same input signal. Note that adding a specific layer such as gated recurrent unit 802 is just one example of many different architectural changes that can be performed. For instance, some implementations may add or remove recurrent layers, convolutional layers, pooling layers, etc.

Example Enhancement Model Adaptation Workflow

Figure 9:
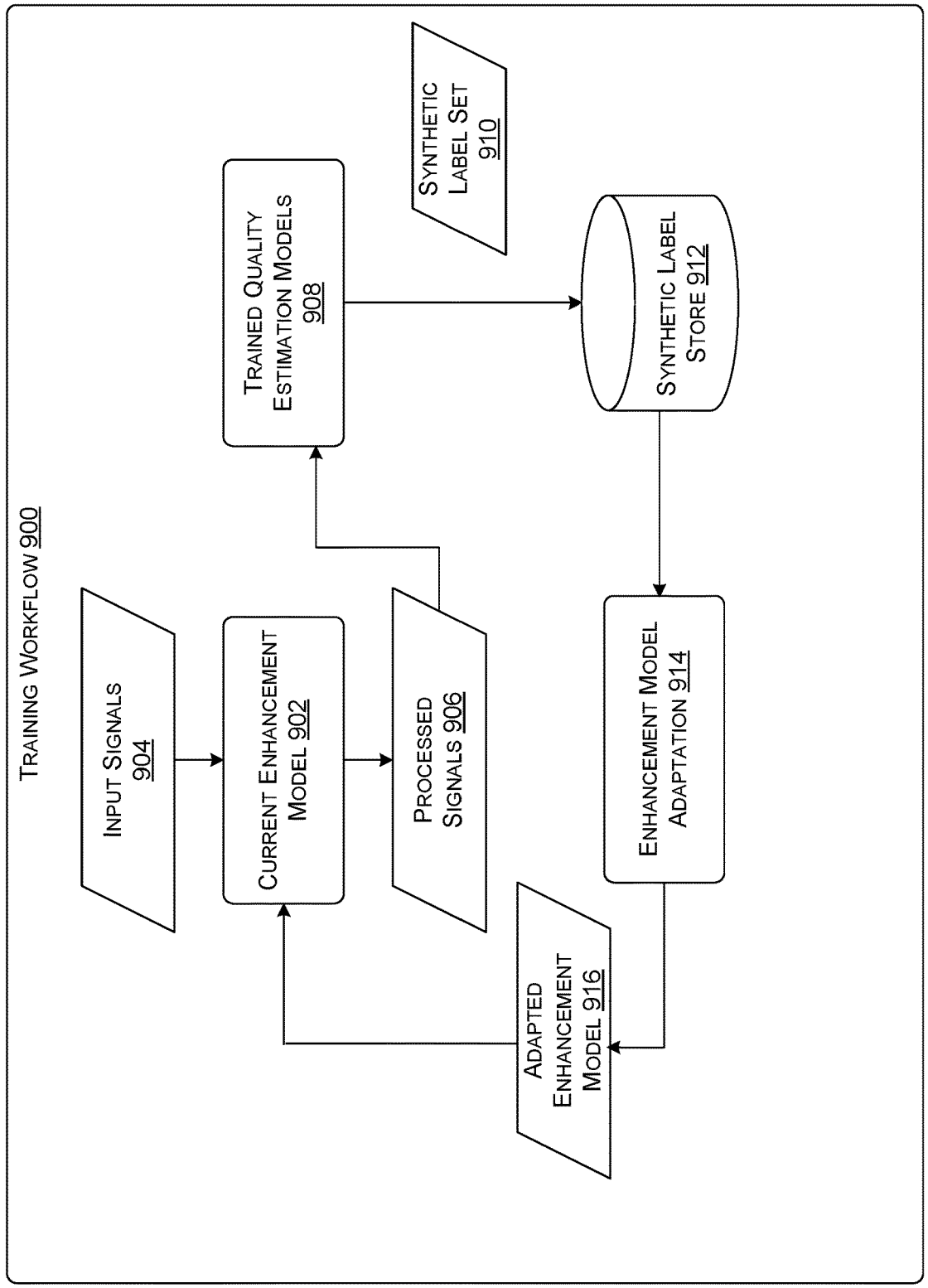
FIG. 9 illustrates an example workflow for modifying a data enhancement model, consistent with some implementations of the present concepts.

FIG. 9 illustrates an example training workflow 900 for training a quality estimation model, consistent with some implementations of the present concepts.

A current enhancement model 902 is used to process input signals 904. The current enhancement model produces processed signals 906. The processed signals are input to trained quality estimation models 908, which produce synthetic label sets 910, each of which can include synthetic labels for different signal characteristics of the input signals. The synthetic labels are stored in a synthetic label store 912. An enhancement model adaptation process 914 is performed on the current enhancement model to obtain an adapted enhancement model 916. The adapted enhancement model can be used as the current enhancement model for the next iteration of model adaptation.

As previously noted, enhancement model adaptation can involve adjusting internal parameters, such as neural network weights and bias values. In such implementations, a loss function can be defined over the values of the synthetic label sets 910, where lower quality values for the synthetic labels generally imply greater loss values. The loss function can consider synthetic labels for at least two different signal characteristics (potentially weighted differently) and/or produced by at least two different quality estimation models. The calculated loss values can be back-propagated through the data enhancement model to adjust the internal parameters.

Enhancement model adaptation can also involve architectural changes. For instance, an initial pool of candidate data enhancement model structures can be defined, where each candidate model structure has a specified number and type of layers, connectivity, activation functions, etc. Individual candidate model structures can be trained using training workflow 900, and relatively high-performing candidate model structures can be retained for modification, where a "high-performing" candidate model structure implies relatively higher average synthetic quality labels for processed signals produced using that model structure. Next, these high-performing candidate model structures can be modified, e.g., by adding layers, removing layers, changing the type of individual layers, the number of hidden layers, changing layer connectivity or activation functions, and so on, to obtain a new pool of candidate model structures. This process can be repeated several times until a final candidate model is selected and trained using synthetic labels as described above.

Note that enhancement model adaptation can also involve selection of hyperparameters such as learning rates, batch sizes, numbers of training epochs, etc. In some cases, the same enhancement model structure can be trained with synthetic quality labels using different learning rates and/or batch sizes, resulting in multiple enhancement models sharing structure but having different internal parameters.

Example User Experience

Figure 10:
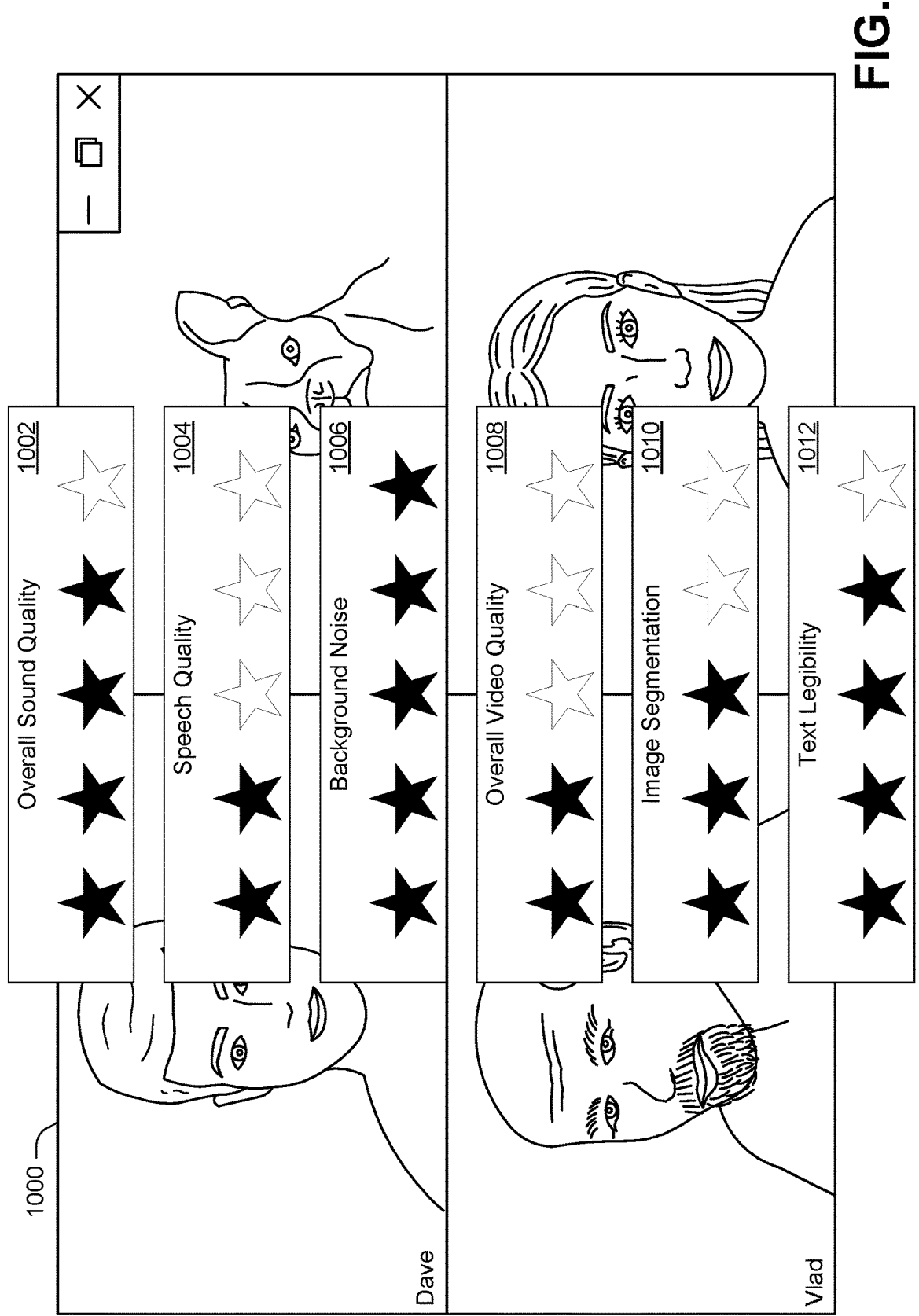
FIG. 10 illustrates an example user experience and user interface, consistent with some implementations of the present concepts.

Quality estimation models such as those disclosed herein can also be employed for real-time estimation of signal quality. FIG. 10 illustrates a video call GUI 1000 that can be populated with information obtained from multiple quality estimation models trained as disclosed herein. Video call GUI 1000 includes an overall sound quality estimate 1002 that conveys a value of four stars out of five for the audio signal of a video call, a speech quality estimate 1004 that conveys a value of two stars for the speech quality of the audio signal, and a background noise quality estimate 1006 that conveys a value of five stars for the background noise of the audio signal. Video call GUI 1000 also includes a video quality estimate 1008 that conveys a value of two stars out of five for the overall video signal of the video call, an image segmentation quality estimate 1010 that conveys a three-star rating for how well the foreground objects (users) were segmented from an artificial background in the image by an image segmentation model, and a text legibility estimate 1012 that conveys a four-star rating for the legibility of text presented during the video.

In some cases, video call GUI 1000 can include an option for the user to confirm or modify the audio or video quality ratings for each individual audio or video characteristic. The user input can be used to manually label audio or video content of the call for subsequent training and/or tuning of quality estimation models for overall quality and/or for specific signal characteristics, as described above.

Specific Models and Experimental Results

The following discussion presents results obtained on a test set of 600 noisy speech clips processed by about 40 different noise suppression models. The real recordings in the test set were captured in a variety of noise types and Signal to Noise Ratio (SNR) and target levels. The test set is comprised of over 100 noise types and speakers rated with MOS or "mean opinion score" quality labels. The speech quality ratings of the processed clips varied from very poor quality labels (MOS=1) to excellent (MOS=5) for speech quality (SIG), background noise quality (BAK), and overall quality (OVRL), in accordance with the subjective test ITU-T P.835. Additional details are available at ITU-T Recommendation P.835, *Subjective test methodology for evaluating speech communication systems that include noise suppression algorithm*, International Telecommunication Union, Geneva, 2003. In total, about 30,000 audio clips were employed, and the average length of each audio clip was about 9 seconds.

A subset of the dataset is summarized below in Table 1. This is a large P.835 dataset that can be employed to train a non-intrusive speech quality assessment model such as a deep neural network. By employing a large number (e.g., 40) of deep noise suppression models on this dataset, a large variety of suppression artifacts can be obtained. As a consequence, a speech quality assessment model for noise suppressors can be obtained that generalizes well.

TABLE 1

| Team # | Stationary DMOS | Emotional DMOS | Tonal DMOS | Non-English DMOS | Musical DMOS | English DMOS | Overall DMOS | CI |
|---|---|---|---|---|---|---|---|---|
| (a) Speech MOS ||||||||
| 38 | 0.00 | 0.05 | (0.07) | 0.12 | 0.03 | (0.02) | 0.03 | 0.04 |
| 36 | 0.01 | 0.07 | 0.00 | 0.16 | (0.17) | (0.11) | 0.01 | 0.04 |
| Noisy | 0 (4.02) | 0 (3.83) | 0 (3.93) | 0 (3.8) | 0 (3.97) | 0 (3.87) | 0 (3.89) | 0.04 |
| 40 | (0.04) | (0.08) | (0.17) | 0.03 | (0.21) | (0.23) | (0.10) | 0.04 |
| 33 | (0.13) | (0.15) | (0.21) | 0.03 | (0.13) | (0.23) | (0.12) | 0.04 |
| 13 | (0.15) | (0.15) | (0.17) | 0.04 | (0.26) | (0.24) | (0.13) | 0.04 |
| 19 | (0.21) | (0.18) | (0.13) | 0.06 | (0.26) | (0.31) | (0.15) | 0.04 |
| 34 | (0.16) | (0.17) | (0.12) | 0.08 | (0.41) | (0.36) | (0.17) | 0.04 |
| 1 | (0.09) | (0.24) | (0.20) | 0.06 | (0.38) | (0.34) | (0.17) | 0.04 |
| 18 | (0.35) | (0.48) | (0.47) | (0.06) | (0.73) | (0.54) | (0.39) | 0.04 |
| 30 | (0.44) | (0.80) | (0.23) | (0.24) | (0.53) | (0.49) | (0.43) | 0.05 |
| 20 | (0.48) | (0.65) | (0.38) | (0.18) | (0.62) | (0.60) | (0.45) | 0.04 |
| 8 | (0.47) | (0.57) | (0.37) | (0.17) | (0.97) | (0.76) | (0.52) | 0.05 |
| 31 | (0.45) | (0.63) | (0.54) | (0.26) | (0.84) | (0.68) | (0.53) | 0.05 |
| Baseline | (0.49) | (0.68) | (0.49) | (0.27) | (0.74) | (0.72) | (0.54) | 0.04 |
| 4 | (0.62) | (0.69) | (0.65) | (0.51) | (0.50) | (0.73) | (0.61) | 0.05 |
| 22 | (0.46) | (0.94) | (0.63) | (0.33) | (0.85) | (0.80) | (0.62) | 0.05 |
| 12 | (0.54) | (1.08) | (0.56) | (0.31) | (1.16) | (0.86) | (0.69) | 0.05 |
| 11 | (0.82) | (1.09) | (0.71) | (0.41) | (1.03) | (0.84) | (0.76) | 0.05 |
| 37 | (0.72) | (0.99) | (0.64) | (0.43) | (1.10) | (1.01) | (0.78) | 0.05 |
| 28 | (0.94) | (1.39) | (0.87) | (0.66) | (1.55) | (1.12) | (1.03) | 0.05 |
| (b) Background Noise MOS ||||||||
| 36 | 1.92 | 2.73 | 1.82 | 1.54 | 2.39 | 2.31 | 2.05 | 0.02 |
| 1 | 1.90 | 2.59 | 1.71 | 1.54 | 2.25 | 2.21 | 1.98 | 0.03 |
| 18 | 1.82 | 2.63 | 1.61 | 1.42 | 2.07 | 2.24 | 1.91 | 0.03 |
| 33 | 1.78 | 2.42 | 1.54 | 1.40 | 2.27 | 2.13 | 1.87 | 0.03 |
| 13 | 1.73 | 2.28 | 1.48 | 1.34 | 2.01 | 1.94 | 1.74 | 0.03 |
| 22 | 1.77 | 2.20 | 1.37 | 1.36 | 1.91 | 1.97 | 1.73 | 0.03 |
| 34 | 1.78 | 2.15 | 1.51 | 1.28 | 1.84 | 1.84 | 1.68 | 0.03 |
| 8 | 1.62 | 2.01 | 1.36 | 1.17 | 1.81 | 1.83 | 1.59 | 0.03 |
| 37 | 1.69 | 2.14 | 1.46 | 1.13 | 1.61 | 1.78 | 1.58 | 0.04 |
| 19 | 1.48 | 1.92 | 1.36 | 1.14 | 1.84 | 1.68 | 1.52 | 0.03 |
| 12 | 1.82 | 2.13 | 1.44 | 1.07 | 1.13 | 1.58 | 1.47 | 0.04 |
| Baseline | 1.35 | 1.68 | 1.32 | 0.92 | 0.97 | 1.64 | 1.28 | 0.04 |
| 20 | 1.55 | 1.61 | 1.29 | 1.06 | 1.04 | 1.34 | 1.28 | 0.04 |
| 11 | 1.39 | 1.52 | 0.95 | 0.86 | 1.43 | 1.30 | 1.20 | 0.04 |
| 40 | 1.50 | 1.52 | 0.97 | 0.86 | 1.10 | 1.21 | 1.15 | 0.04 |
| 31 | 1.24 | 1.70 | 1.08 | 0.72 | 1.21 | 1.21 | 1.12 | 0.04 |

TABLE 1-continued

| Team # | Stationary DMOS | Emotional DMOS | Tonal DMOS | Non-English DMOS | Musical DMOS | English DMOS | Overall DMOS | CI |
|---|---|---|---|---|---|---|---|---|
| 28 | 1.01 | 1.34 | 0.91 | 0.78 | 0.80 | 1.22 | 1.00 | 0.04 |
| 30 | 1.53 | 1.23 | 0.87 | 0.64 | 0.62 | 0.59 | 0.85 | 0.05 |
| 4 | 0.24 | 0.49 | 0.26 | 0.13 | 0.33 | 0.16 | 0.23 | 0.04 |
| Noisy | 0 (2.86) | 0 (1.93) | 0 (2.91) | 0 (3.11) | 0 (2.14) | 0 (2.3) | 0 (2.6) | 0.04 |
| 38 | (0.09) | (0.04) | (0.04) | (0.03) | 0.04 | 0.01 | (0.02) | 0.04 |
| (c) Overall MOS | | | | | | | | |
| 36 | 0.89 | 1.51 | 0.79 | 0.80 | 1.14 | 1.11 | 1.01 | 0.04 |
| 1 | 0.85 | 1.16 | 0.65 | 0.69 | 0.89 | 0.92 | 0.85 | 0.04 |
| 33 | 0.74 | 1.16 | 0.56 | 0.57 | 1.06 | 0.93 | 0.81 | 0.04 |
| 13 | 0.76 | 1.14 | 0.60 | 0.60 | 0.97 | 0.90 | 0.80 | 0.04 |
| 34 | 0.69 | 1.13 | 0.59 | 0.64 | 0.76 | 0.75 | 0.74 | 0.04 |
| 19 | 0.61 | 0.98 | 0.58 | 0.57 | 0.90 | 0.74 | 0.71 | 0.04 |
| 18 | 0.59 | 1.02 | 0.40 | 0.55 | 0.55 | 0.75 | 0.64 | 0.04 |
| 40 | 0.79 | 0.94 | 0.37 | 0.40 | 0.62 | 0.63 | 0.60 | 0.04 |
| 8 | 0.41 | 0.79 | 0.37 | 0.39 | 0.25 | 0.41 | 0.42 | 0.04 |
| 22 | 0.51 | 0.50 | 0.18 | 0.30 | 0.42 | 0.42 | 0.39 | 0.05 |
| 20 | 0.44 | 0.48 | 0.28 | 0.36 | 0.30 | 0.39 | 0.38 | 0.04 |
| 31 | 0.37 | 0.60 | 0.20 | 0.20 | 0.28 | 0.35 | 0.32 | 0.04 |
| Baseline | 0.25 | 0.47 | 0.31 | 0.21 | 0.21 | 0.41 | 0.30 | 0.04 |
| 12 | 0.39 | 0.33 | 0.29 | 0.23 | 0.00 | 0.28 | 0.25 | 0.04 |
| 30 | 0.44 | 0.27 | 0.31 | 0.12 | 0.16 | 0.17 | 0.22 | 0.04 |
| 37 | 0.18 | 0.41 | 0.15 | 0.13 | 0.13 | 0.20 | 0.19 | 0.04 |
| 11 | 0.07 | 0.25 | (0.08) | 0.09 | 0.16 | 0.25 | 0.14 | 0.04 |
| 38 | (0.12) | 0.04 | (0.10) | 0.02 | 0.09 | 0.06 | 0.01 | 0.04 |
| Noisy | 0 (3.03) | 0 (2.28) | 0 (3) | 0 (3.04) | 0 (2.57) | 0 (2.52) | 0 (2.77) | 0.04 |
| 28 | (0.12) | (0.07) | (0.10) | (0.12) | (0.44) | (0.02) | (0.13) | 0.04 |
| 4 | (0.22) | 0.13 | (0.26) | (0.27) | 0.02 | (0.15) | (0.15) | 0.04 |

The ground truth MOS scores were obtained for audio clips with an average length of 9 secs sampled at 16 kHz. Log powered spectrograms were employed as input features and extracted over 9 second durations, as these spectrograms correlate well with human perception and generally works very well for analyzing speech quality. For spectral features, a frame size of 20 ms with a hop length of 10 ms was employed. The input features were then converted to dB scale.

Different convolutional neural networks (CNN) were evaluated, and the architecture for the best performing model is shown below in Table 2. The input to the model is log power Mel Spectrogram with 320 FFT size computed over a clip of length 9 seconds sampled at 16 kHz with a frame size of 20 ms and hop length of 10 ms. This results in an input dimension of 900×161. Two different models with almost the same architecture except for the last layer were trained. One model is trained to predict all 3 outputs (SIG, BAK, OVRL) and the other model is trained to predict only SIG, as prediction of SIG is a much harder task and is less correlated with BAK and OVRL. Both models were trained with a batch size of 32 and mean squared error loss function until the loss saturated, without feature normalization.

TABLE 2

| Layer | Output dimension |
|---|---|
| Input | 900 × 120 × 1 |
| Conv: 128, (3 × 3), 'ReLU' | 900 × 161 × 128 |
| Conv: 64, (3 × 3), 'ReLU' | 900 × 161 × 64 |
| Conv: 64, (3 × 3), 'ReLU' | 900 × 161 × 64 |
| Conv: 32, (3 × 3), 'ReLU' | 900 × 161 × 32 |
| MaxPool: (2 × 2), Dropout(0.3) | 450 × 80 × 32 |
| Conv: 32, (3 × 3), 'ReLU' | 450 × 80 × 32 |
| MaxPool: (2 × 2), Dropout(0.3) | 225 × 40 × 32 |
| Conv: 32, (3 × 3), 'ReLU' | 112 × 20 × 32 |
| MaxPool: (2 × 2), Dropout(0.3) | 112 × 15 × 32 |
| Conv: 64, (3 × 3), 'ReLU' | 112 × 20 × 64 |
| GlobalMaxPool | 1 × 64 |
| Dense: 128, 'ReLU' | 1 × 128 |
| Dense: 64, 'ReLU' | 1 × 64 |
| Dense: 1 or 3 | 1 × 1 or 1 × 3 |

A test set used to evaluate the trained model involved P.835 evaluation of 17 different available noise suppression models on an unseen set of 850 clips. The (c) Overall MOS clips span various categories like Emotional, English, Non-English with and without Tonal languages and Stationary noises. The test set has similar categories as the training data, adding mouse clicks and improving the quality of emotional speech. The test set was created using crowdsourcing using the method described in Chandan K A Reddy, Harishchandra Dubey, Kazuhito Koishida, Arun Nair, Vishak Gopal, Ross Cutler, Sebastian Braun, Hannes Gamper, Robert Aichner, and Sriram Srinivasan, "INTERSPEECH 2021 Deep Noise Suppression Challenge," in INTERSPEECH, 2021.

The Pearson Correlation Coefficient (PCC) or mean squared error between the predictions of the developed objective metric and the ground truth human ratings can be used to measure the accuracy of the model. For stack ranking different noise suppressors, the average of ratings across the entire test set was computed for each model and used to determine the Spearman Rank Correlation Coefficient (SRCC). The SRCC and PCC between averaged human ratings and the trained quality estimation models was computed on the created test set, and the following results were obtained:

TABLE 3

|  | SIG | BAK | OVRL |
|---|---|---|---|
| PCC | 0.94 | 0.98 | 0.98 |
| SRCC | 0.95 | 0.99 | 0.98 |

Thus, the trained models described in this section provide robust speech quality metrics designed to stack rank noise suppressors with great accuracy. Similar models can be developed for other impairment types such as network distortions, codec artifacts, and reverberation without the need for large scale data with human labels.

Device Implementations

As noted above with respect to FIG. 1, system 100 includes several devices, including a client device 110, a server 120, a server 130, and a server 140. As also noted, not all device implementations can be illustrated, and other device implementations should be apparent to the skilled artisan from the description above and below.

The term "device", "computer," "computing device," "client device," and or "server device" as used herein can mean any type of device that has some amount of hardware processing capability and/or hardware storage/memory capability. Processing capability can be provided by one or more hardware processors (e.g., hardware processing units/cores) that can execute computer-readable instructions to provide functionality. Computer-readable instructions and/or data can be stored on storage, such as storage/memory and or the datastore. The term "system" as used herein can refer to a single device, multiple devices, etc.

Storage resources can be internal or external to the respective devices with which they are associated. The storage resources can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that devices generally can have input and/or output functionality. For example, computing devices can have various input mechanisms such as keyboards, mice, touchpads, voice recognition, gesture recognition (e.g., using depth cameras such as stereoscopic or time-of-flight camera systems, infrared camera systems, RGB camera systems or using accelerometers/gyroscopes, facial recognition, etc.). Devices can also have various output mechanisms such as printers, monitors, etc.

Also note that the devices described herein can function in a stand-alone or cooperative manner to implement the described techniques. For example, the methods and functionality described herein can be performed on a single computing device and/or distributed across multiple computing devices that communicate over network(s) 150. Without limitation, network(s) 150 can include one or more local area networks (LANs), wide area networks (WANs), the Internet, and the like.

Various examples are described above. Additional examples are described below. One example includes a method comprising obtaining training signals exhibiting diverse impairments introduced when the training signals are captured or diverse artifacts introduced by different processing characteristics of a plurality of data enhancement models, obtaining quality labels for different signal characteristics of the training signals, and training at least two different quality estimation models to estimate quality of at least two different signal characteristics based at least on the training signals and the quality labels.

Another example can include any of the above and/or below examples where the training signals comprise audio signals including speech data.

Another example can include any of the above and/or below examples where the training signals comprise noise-reduced audio signals produced by a plurality of different noise suppression models.

Another example can include any of the above and/or below examples where the quality labels include overall quality labels characterizing overall quality of the noise-reduced audio signals, background noise quality labels characterizing background noise of the noise-reduced audio signals, and speech quality labels characterizing speech quality of the noise-reduced audio signals.

Another example can include any of the above and/or below examples where the method further comprises training a first quality estimation model to estimate speech quality based on the speech quality labels and training a second quality estimation model to estimate overall quality and background noise quality based at least on the overall quality labels, the background noise quality labels, and the speech quality labels.

Another example can include any of the above and/or below examples where the first quality estimation model is trained without using the overall quality labels and without using the background noise quality labels.

Another example can include any of the above and/or below examples where the first quality estimation model and the second quality estimation model comprise deep neural networks sharing multiple intermediate layers and having different output layers and different internal parameters.

Another example can include any of the above and/or below examples where the training signals comprise processed signals output by the plurality of data enhancement models, the plurality of data enhancement models comprising at least one of echo removal models, distortion removal models, codecs, or models for addressing quality degradation caused by room response, network loss/jitter issues, or device distortion.

Another example can include any of the above and/or below examples where the training signals comprise image or video data.

Another example can include any of the above and/or below examples where the image or video data comprise segmented image data or segmented video data produced by a plurality of different segmentation models that separate the image or video data into foreground objects and background.

Another example can include any of the above and/or below examples where the quality labels include overall quality labels characterizing overall quality of the segmented image data or the segmented video data and segmentation quality labels characterizing quality of image segmentation of the segmented image data or the segmented video data.

Another example can include any of the above and/or below examples where the method further comprises training a first quality estimation model to estimate image segmentation quality based on the segmentation quality labels and training a second quality estimation model to estimate overall image quality based at least on the overall quality labels and the segmentation quality labels.

Another example can include any of the above and/or below examples where the training signals comprise processed signals output by the plurality of data enhancement models, the plurality of data enhancement models comprising at least one of image/video healing models, low light enhancement models, image/video sharpening models, image/video denoising models, codecs, or models for addressing quality degradation caused by color balance issues, veiling glare issues, low contrast issues, flickering issues, low dynamic range issues, camera jitter issues, frame drop issues, frame jitter issues, and/or audio video synchronization issues.

Another example can include any of the above and/or below examples where the method further comprises providing an overall quality estimation model using the at least two different quality estimation models and another quality estimation model trained on other training signals exhibiting different impairments.

Another example includes a system comprising a processor and a storage medium storing instructions which, when executed by the processor, cause the system to access a plurality of quality estimation models that have been trained to estimate signal quality of different signal characteristics using training signals, the training signals having corresponding quality labels for the different signal characteristics and exhibiting diverse impairments introduced when the training signals were captured or diverse artifacts introduced by a plurality of data enhancement models, provide an input signal to the plurality of quality estimation models, and process the input signal with the plurality of quality estimation models to obtain a plurality of synthetic quality labels, output by the plurality of quality estimation models, that characterize the different signal characteristics of the input signal.

Another example can include any of the above and/or below examples where the input signal is produced by another data enhancement model and the instructions, when executed by the processor, cause the system to modify the another data enhancement model based at least on the plurality of synthetic quality labels, output by the plurality of quality estimation models, that characterize the different characteristics of the input signal produced by the another data enhancement model.

Another example can include any of the above and/or below examples where the input signal comprises audio data and the another data enhancement model is configured as at least one of a noise removal model, an echo removal model, a distortion removal model, a codec, or a model for addressing quality degradation caused by room response or network loss/jitter.

Another example can include any of the above and/or below examples where the input signal comprises image or video data and the another data enhancement model is configured as at least one of an image/video healing model, a low light enhancement model, an image/video sharpening model, an image/video denoising model, a codec, or a model for addressing quality degradation caused by color balance issues, veiling glare issues, low contrast issues, flickering issues, low dynamic range issues, camera jitter issues, frame drop issues, frame jitter issues, and/or audio video synchronization issues.

Another example can include any of the above and/or below examples where the instructions, when executed by the processor, cause the system to obtain a plurality of input signals produced by a plurality of other data enhancement models, process the plurality of input signals using the plurality of quality estimation models, and rank the plurality of other data enhancement models based at least on the plurality of synthetic quality labels output by the plurality of quality estimation models.

Another example includes a computer-readable storage medium storing instructions which, when executed by a computing device, cause the computing device to perform acts comprising obtaining audio data produced by a plurality of data enhancement models, obtaining quality labels for different characteristics of the audio data, and using the audio data as training signals to train a plurality of different quality estimation models to estimate quality of the different characteristics based at least on the quality labels, the plurality of different quality estimation models including a first quality estimation model trained to estimate effectiveness of the plurality of data enhancement models at removing a particular type of impairment and a second quality estimation model trained to estimate an extent to which the plurality of data enhancement models introduce artifacts into the audio data when removing the particular type of impairment.

Another example can include any of the above and/or below examples where the plurality of data enhancement models include noise suppressors configured to reduce audio noise, the first quality estimation model is trained to estimate quality of speech as impacted by the artifacts introduced by reduction of the audio noise by the noise suppressors, and the second quality estimation model is trained to estimate background noise present in the training signals after the reduction of the audio noise by the noise suppressors.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A method comprising:
obtaining training signals exhibiting diverse impairments introduced when the training signals are captured or diverse artifacts introduced by different processing characteristics of a plurality of data enhancement models;
obtaining quality labels for different signal characteristics of the training signals, the quality labels including speech quality labels, overall quality labels, and background noise quality labels;
training a first quality estimation model to estimate speech quality based at least on the speech quality labels; and
training a second quality estimation model to estimate overall quality and background noise quality based at least on the overall quality labels, the background noise quality labels, and the speech quality labels.

2. The method of claim 1, the first quality estimation model and the second quality estimation model being neural networks.

3. The method of claim 2, the training signals comprising noise-reduced audio signals produced by a plurality of different noise suppression models.

4. The method of claim 1, wherein the first quality estimation model is trained without using the overall quality labels and without using the background noise quality labels.

5. The method of claim 4, wherein the first quality estimation model and the second quality estimation model comprise deep neural networks sharing multiple intermediate layers and having different output layers and different internal parameters.

6. The method of claim 1, further comprising:
providing an overall quality estimation model using the first quality estimation model, the second quality estimation model, and another quality estimation model trained on other training signals exhibiting different impairments.

7. The method of claim 1, the first quality estimation model and the second quality estimation model having respective neural network structures that share one or more convolutional layers and have different output layers.

8. A system comprising:
a processor; and
a storage medium storing instructions which, when executed by the processor, cause the system to:
access a plurality of quality estimation models that have been trained to estimate signal quality of different signal characteristics using training signals, the training signals having corresponding quality labels for the different signal characteristics including speech quality labels, overall quality labels, and background noise quality labels, the training signals exhibiting diverse impairments introduced when the training signals were captured or diverse artifacts introduced by a plurality of data enhancement models, the plurality of quality estimation models including a first quality estimation model trained to estimate speech quality based at least on the speech quality labels and a second quality estimation model trained to estimate overall quality and background noise quality based at least on the overall quality labels, the background noise quality labels, and the speech quality labels;
provide an input signal to the plurality of quality estimation models; and
process the input signal with the plurality of quality estimation models to obtain a plurality of synthetic quality labels, output by the plurality of quality estimation models, that characterize the different signal characteristics of the input signal.

9. The system of claim 8, wherein the input signal is produced by another data enhancement model and the instructions, when executed by the processor, cause the system to:
modify the another data enhancement model based at least on the plurality of synthetic quality labels, output by the plurality of quality estimation models, that characterize the different signal characteristics of the input signal produced by the another data enhancement model.

10. The system of claim 9, wherein the another data enhancement model is configured as at least one of a noise removal model, an echo removal model, a distortion removal model, a codec, or a model for addressing quality degradation caused by room response or network loss/jitter.

11. The system of claim 8, wherein the instructions, when executed by the processor, cause the system to:
obtain a plurality of input signals produced by a plurality of other data enhancement models;
process the plurality of input signals using the plurality of quality estimation models; and
rank the plurality of other data enhancement models based at least on the plurality of synthetic quality labels output by the plurality of quality estimation models.

12. A computer-readable storage medium storing instructions which, when executed by a computing device, cause the computing device to perform acts comprising:
obtaining audio training data produced by a plurality of data enhancement models;
obtaining quality labels for different characteristics of the audio training data, the quality labels including speech quality labels, overall quality labels, and background noise quality labels; and
training a plurality of different quality estimation models using the audio training data to estimate quality of the different characteristics based at least on the quality labels, the plurality of different quality estimation models including a first quality estimation model trained to estimate speech quality based at least on the speech quality labels and a second quality estimation model trained to estimate overall quality and background noise quality based at least on the overall quality labels, the background noise quality labels, and the speech quality labels.

13. The computer-readable storage medium of claim 12, wherein the plurality of data enhancement models include noise suppressors configured to reduce audio noise.

14. The computer-readable storage medium of claim 13, the acts further comprising:
employing the first quality estimation model to produce synthetic labels characterizing speech quality of input signals; and
employing the second quality estimation model to produce synthetic labels characterizing overall quality and background noise quality of the input signals.

15. The computer-readable storage medium of claim 14, wherein the first quality estimation model is not employed to produce synthetic labels characterizing the overall quality of the input signals and the first quality estimation model is not employed to produce synthetic labels characterizing the background noise quality of the input signals.

16. The computer-readable storage medium of claim 15, wherein the second quality estimation model is not employed to produce synthetic labels characterizing the speech quality of the input signals.

17. The computer-readable storage medium of claim 16, the first quality estimation model comprising a first convolutional network having a first neural network structure with multiple convolution and pooling layers.

18. The computer-readable storage medium of claim 17, the second quality estimation model comprising a second convolutional neural network with a second neural network structure that shares the multiple convolution and pooling layers with the first neural network structure.

19. The computer-readable storage medium of claim 18, the first quality estimation model comprising an output layer that produces the synthetic labels characterizing the speech quality of the input signals.

20. The computer-readable storage medium of claim 19, the second quality estimation model comprising a first output layer that produces the synthetic labels characterizing the overall quality of the input signals and a second output layer that produces the synthetic labels characterizing the background noise quality of the input signals.

21. The computer-readable storage medium of claim 20, the second quality estimation model comprising a third output layer that is trained using the speech quality labels for the audio training data but is not employed for inference of synthetic labels characterizing speech quality of the input signals.

* * * * *